United States Patent
Yabuki et al.

(10) Patent No.: US 10,600,444 B2
(45) Date of Patent: Mar. 24, 2020

(54) VIDEO IMAGE PROCESSING DEVICE, VIDEO IMAGE PROCESSING METHOD, AND NON-TRANSITORY COMPUTER-READABLE RECORDING MEDIUM

(71) Applicant: FUJITSU LIMITED, Kawasaki-shi, Kanagawa (JP)

(72) Inventors: Akihiko Yabuki, Isehara (JP); Kazuo Sasaki, Kobe (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/425,290

(22) Filed: Feb. 6, 2017

(65) Prior Publication Data

US 2017/0263285 A1 Sep. 14, 2017

(30) Foreign Application Priority Data

Mar. 8, 2016 (JP) .................................. 2016-044896

(51) Int. Cl.
| | |
|---|---|
| *G11B 27/031* | (2006.01) |
| *H04N 7/18* | (2006.01) |
| *A63B 69/00* | (2006.01) |
| *A63B 71/06* | (2006.01) |
| *G06K 9/00* | (2006.01) |

(52) U.S. Cl.
CPC ........ *G11B 27/031* (2013.01); *A63B 69/0071* (2013.01); *A63B 71/0622* (2013.01); *G06K 9/00724* (2013.01); *G06K 9/00765* (2013.01); *H04N 7/181* (2013.01); *A63B 2220/806* (2013.01)

(58) Field of Classification Search
CPC .................................................... G11B 27/031
USPC .......................................................... 386/228
See application file for complete search history.

(56) References Cited

U.S. PATENT DOCUMENTS

| | | |
|---|---|---|
| 2004/0064207 A1 | 4/2004 | Zacks et al. |
| 2005/0117033 A1 | 6/2005 | Matsui |
| 2008/0201379 A1 | 8/2008 | Nakate |

(Continued)

FOREIGN PATENT DOCUMENTS

| | | |
|---|---|---|
| JP | 7-306012 | 11/1995 |
| JP | 2004-129264 | 4/2004 |
| JP | 2005-167517 | 6/2005 |

(Continued)

OTHER PUBLICATIONS

Japanese Office Action dated Jul. 16, 2019 in corresponding Japanese Patent Application No. 2016-044896.

(Continued)

*Primary Examiner* — Eileen M Adams
*Assistant Examiner* — Daniel T Tekle
(74) *Attorney, Agent, or Firm* — Staas & Halsey LLP

(57) ABSTRACT

A video image processing device receives information indicating whether an event has occurred in a competition area in which different regions are captured by a plurality of cameras, determines a camera that captured a video image of one of the different regions at which the event has occurred, extracts a partial video image obtained at the time at which the event has occurred from video image information on video images captured by the determined camera and stores the extracted partial video image to the memory.

17 Claims, 22 Drawing Sheets

(56) References Cited

U.S. PATENT DOCUMENTS

2015/0262015 A1 9/2015 Oguchi et al.
2016/0307335 A1* 10/2016 Perry .................... G06T 7/2093

FOREIGN PATENT DOCUMENTS

JP  2008-236729  10/2008
JP  2015-177470  10/2015

OTHER PUBLICATIONS

Office Action dated Oct. 8, 2019 in corresponding Japanese Patent Application No. 2016-044896.

* cited by examiner

FIG.6

| CAMERA IDENTIFICATION INFORMATION | AREA IDENTIFICATION INFORMATION | VIDEO IMAGE INFORMATION |
|---|---|---|
| CAMERA 10a | AREA A | INFORMATION ON VIDEO IMAGE CAPTURED BY CAMERA 10a |
| CAMERA 10b | AREA B | INFORMATION ON VIDEO IMAGE CAPTURED BY CAMERA 10b |
| CAMERA 10c | AREA C | INFORMATION ON VIDEO IMAGE CAPTURED BY CAMERA 10c |
| CAMERA 10d | AREA D | INFORMATION ON VIDEO IMAGE CAPTURED BY CAMERA 10d |

FIG.7

| PLAYER IDENTIFICATION INFORMATION | TRACKING INFORMATION |
|---|---|
| TEAM A, 1 | TRACKING INFORMATION ON PLAYER IDENTIFIED BY (TEAM A, 1) |
| TEAM A, 2 | TRACKING INFORMATION ON PLAYER IDENTIFIED BY (TEAM A, 2) |
| ... | ... |
| TEAM B, 1 | TRACKING INFORMATION ON PLAYER IDENTIFIED BY (TEAM B, 1) |
| TEAM B, 2 | TRACKING INFORMATION ON PLAYER IDENTIFIED BY (TEAM B, 2) |

FIG.8

| TIME | PLAYER IDENTIFICATION INFORMATION | ACTION IDENTIFICATION INFORMATION |
|---|---|---|
| t1 | TEAM A, 1 | SHOOT |
| t2 | TEAM A, 1 | SHOOT |
| t2 | TEAM A, 1 | ASSIST |
| ... | | |
| t4 | TEAM A, 3 | ASSIST |
| t5 | TEAM B, 1 | CUT IN |

FIG.13

| CAMERA IDENTIFICATION INFORMATION | AREA IDENTIFICATION INFORMATION | VIDEO IMAGE INFORMATION |
|---|---|---|
| CAMERA 10a | AREA a | INFORMATION ON VIDEO IMAGE CAPTURED BY CAMERA 10a |
| CAMERA 10b | AREA b | INFORMATION ON VIDEO IMAGE CAPTURED BY CAMERA 10b |

FIG.14

| TIME | AREA IDENTIFICATION INFORMATION |
|---|---|
| t1 TO t2 | AREA a |
| t2 TO t3 | AREA b |
| t3 TO t4 | AREA a |
| ... | |

FIG.18

| CAMERA IDENTIFICATION INFORMATION | AREA IDENTIFICATION INFORMATION | VIDEO IMAGE INFORMATION |
|---|---|---|
| CAMERA 10a | AREA A | INFORMATION ON VIDEO IMAGE CAPTURED BY CAMERA 10a |
| CAMERA 10b | AREA B | INFORMATION ON VIDEO IMAGE CAPTURED BY CAMERA 10b |
| CAMERA 10c | AREA C | INFORMATION ON VIDEO IMAGE CAPTURED BY CAMERA 10c |
| CAMERA 10d | AREA D | INFORMATION ON VIDEO IMAGE CAPTURED BY CAMERA 10d |
| CAMERA 20a | REGION INCLUDING GOAL | INFORMATION ON VIDEO IMAGE CAPTURED BY CAMERA 20a |
| CAMERA 20b | REGION INCLUDING GOAL | INFORMATION ON VIDEO IMAGE CAPTURED BY CAMERA 20b |

| TIME | AREA IDENTIFICATION INFORMATION |
|---|---|
| t1 | AREA A |
| t2 | AREA B |
| t3 | AREA C |
| t4 | AREA D |

342

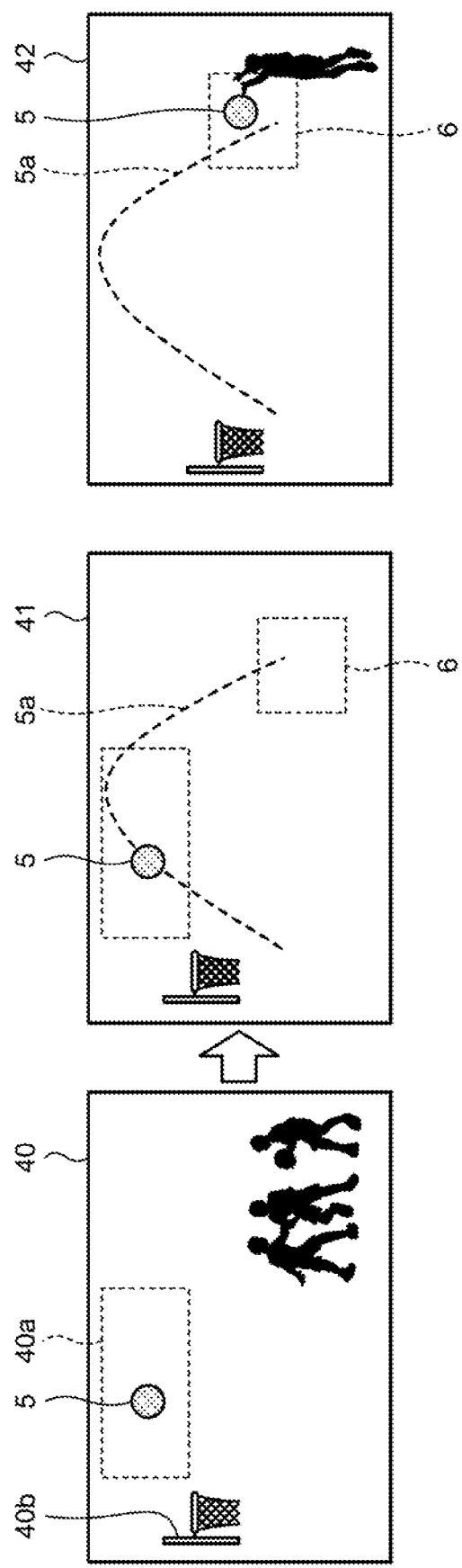

VIDEO IMAGE PROCESSING DEVICE, VIDEO IMAGE PROCESSING METHOD, AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2016-044896, filed on Mar. 8, 2016, the entire contents of which are incorporated herein by reference.

FIELD

The embodiments discussed herein are related to a video image processing device and the like.

BACKGROUND

Various kinds of sport players, coaches, head coaches, and the like sometimes capture video images of games and refer to the video images in order to improve the skill of the players and the strategy of the teams. In recent years, courts equipped with a plurality of cameras become widely available and, if games are played in such courts, after the game, it is possible to check the actions of the players and the entire team by the video image from various angles.

Patent Document 1: Japanese Laid-open Patent Publication No. 2005-167517
Patent Document 2: Japanese Laid-open Patent Publication No. 07-306012
Patent Document 3: Japanese Laid-open Patent Publication No. 2015-177470

However, with the conventional technology described above, there is a problem in that it is not possible to create video image information related to a specific event.

From among pieces of video image information captured by each of the cameras in a court, the number of pieces of the video image information including a specific scene useful for a user is limited. For example, the specific scene is a shoot scene of a player and the like.

Here, if it is possible to create video image information that continuously follows a specific scene, the time and effort needed to refer to another piece of the video image information can be reduced, which is convenient. However, because the camera that captures the specific scene is dynamically changed and is not able to previously expect the timing at which the specific scene occurs, in general, in response to a request from a user, an editor usually refers to all of the pieces of the video image information captured by each of the cameras and manually creates the video image information on video images obtained from continuously following the specific scene, and thus, a large burden is placed on the editor.

SUMMARY

According to an aspect of an embodiment, a video image processing device includes a processor coupled to the memory and the processor configured to receive information indicating whether an event has occurred in a competition area with which video images of different regions of the competition area are captured by a plurality of cameras; determine a camera that captured a video image of one of the different regions at which the event has occurred; extract a partial video image obtained at the time at which the event has occurred from video image information on video images captured by the determined camera; and store the extracted partial video image to the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a schematic diagram illustrating an example of the data structure of a video image table according to the first embodiment;
FIG. 7 is a schematic diagram illustrating an example of the data structure of a tracking table;
FIG. 8 is a schematic diagram illustrating an example of the data structure of an event table;
FIG. 13 is a schematic diagram illustrating an example of the data structure of a video image table according to the second embodiment;
FIG. 14 is a schematic diagram illustrating an example of the data structure of an event table according to the second embodiment;
FIG. 18 is a schematic diagram illustrating an example of the data structure of a video image table according to the third embodiment;
FIG. 19 is a schematic diagram illustrating an example of the data structure of an event table according to the third embodiment;
FIG. 20 is a schematic diagram illustrating a process performed by a shoot scene detecting unit;

DESCRIPTION OF EMBODIMENTS

Preferred embodiments of the present invention will be explained with reference to accompanying drawings. The present invention is not limited to the embodiments.

[a] First Embodiment

Figure 1:
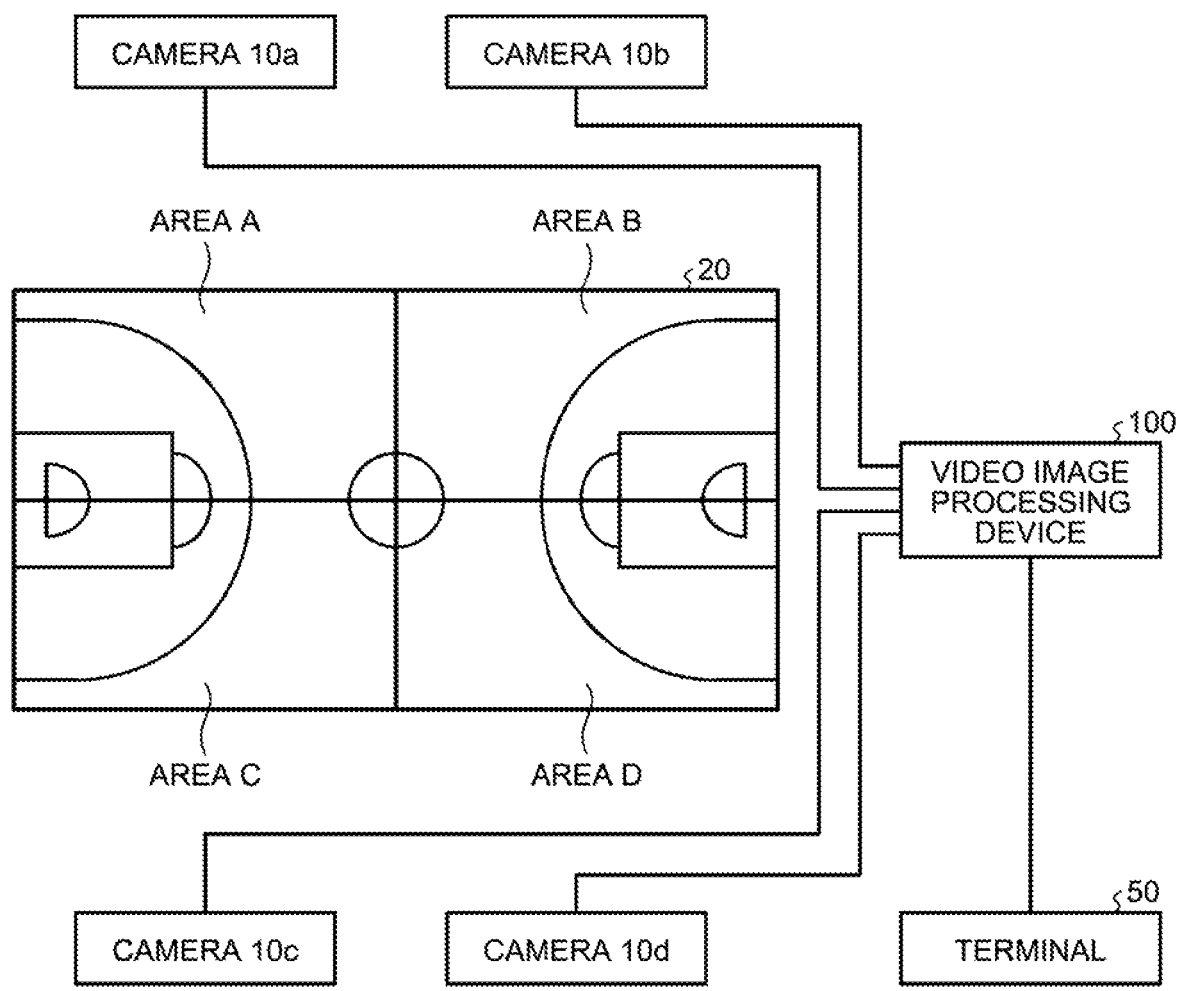
FIG. 1 is a schematic diagram illustrating the configuration of a system according to a first embodiment.

FIG. 1 is a schematic diagram illustrating the configuration of a system according to a first embodiment. As illustrated in FIG. 1, this system includes cameras 10a, 10b, 10c, and 10d, a terminal 50, and a video image processing device 100. The cameras 10a to 10d and the video image processing device 100 are connected with each other. The terminal 50 and the video image processing device 100 are connected with each other. In the first embodiment, in a description below, the cameras 10a to 10d are appropriately referred to as the camera 10 as a group.

The camera 10 is a device that captures a video image in the image capturing range and that sends information on the captured video image to the video image processing device 100. The information on the video image is information that includes therein a plurality of continuous images. In a description below, the information on the video images is referred to as video image information. The camera 10 is arranged in a court 20 in which various kinds of competitions are held.

The camera 10a is a camera that includes, in the image capturing range, an area A in the court 20. The camera 10b is a camera that includes, in the image capturing range, an area B in the court 20. The camera 10c is a camera that includes, in the image capturing range, an area C in the court 20. The camera 10d is a camera that includes, in the image capturing range, an area D in the court 20.

The terminal 50 is a terminal device that is used when a user inputs event information and that corresponds to a tablet terminal, a smart phone, and the like. The terminal 50 outputs event information to the video image processing device 100. The event information is information that includes therein, in an associated manner, player identification information, action identification information, and the time.

The player identification information is information that uniquely identifies a player. In the first embodiment, the player identification information is represented by a combination of a team name and a uniform number of a player. The action identification information is information that uniquely identifies an action of a player. For example, the action identification information includes a shoot, an assist, an intercept, a cut in, and a post up. The time is information that indicates the time at which the event information is input by a user.

Figure 2:
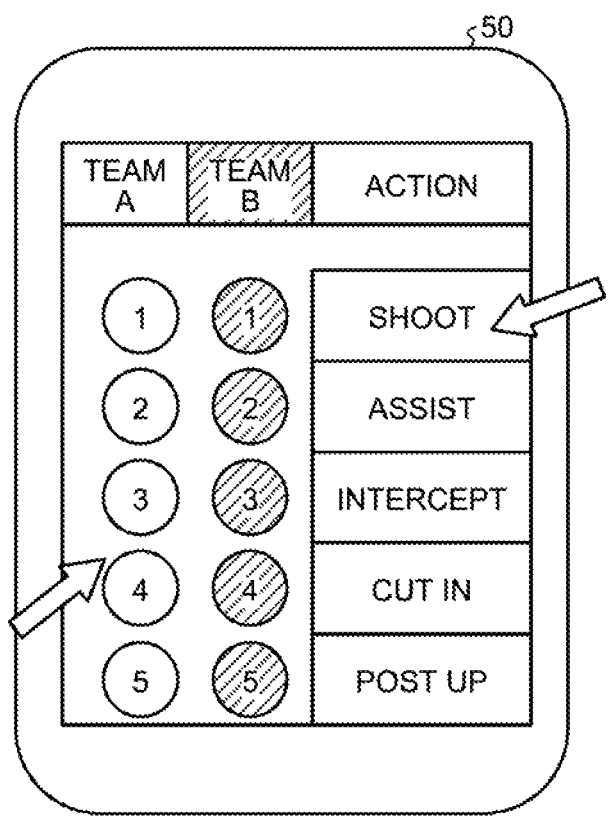
FIG. 2 is a schematic diagram illustrating an example of a display screen of a terminal.

FIG. 2 is a schematic diagram illustrating an example of a display screen of the terminal. For example, if a user inputs, to the terminal 50, the event information indicating that the player with the uniform number of (4) in a team A made a shoot, as illustrated in FIG. 2, the user presses a button "4" associated with the team A and the button "shoot" associated with the action. Furthermore, the terminal 50 judges, by the timer in the own device, the time at which the event information was input. The terminal 50 outputs the event information to the video image processing device 100.

The user repeats the operation described above and the terminal 50 sends the event information to the video image processing device 100 every time the terminal 50 receives the operation.

Figure 3:
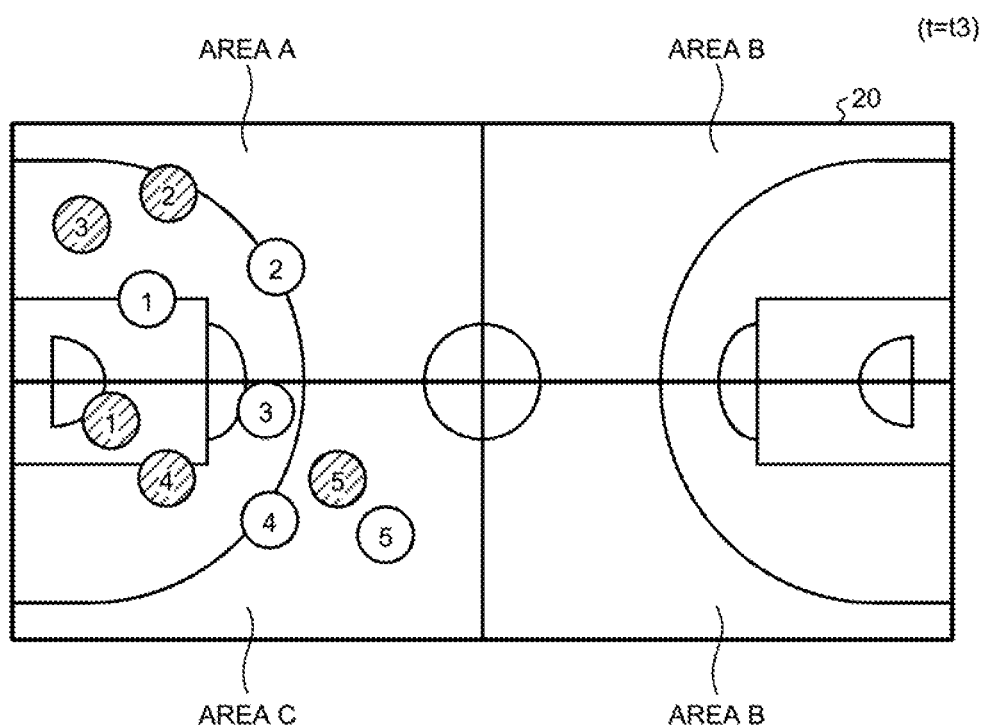
FIG. 3 is a schematic diagram (1) illustrating a process performed by a video image processing device according to the first embodiment.
Figure 4:
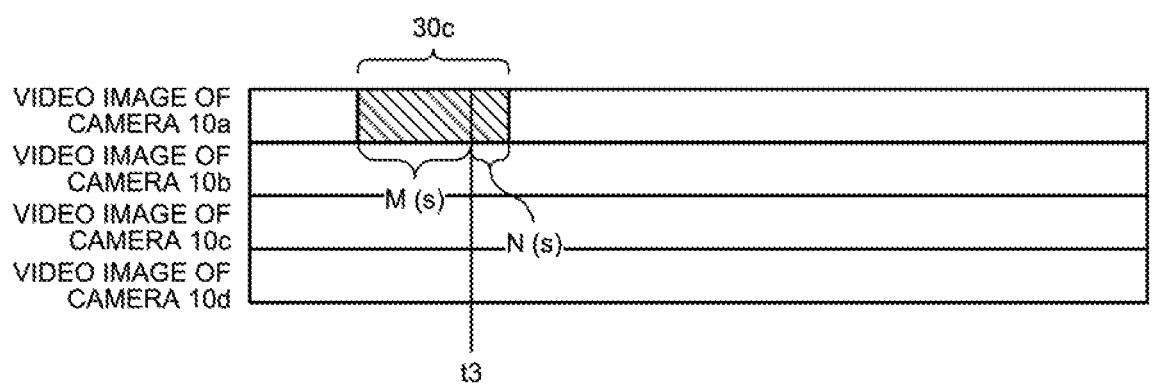
FIG. 4 is a schematic diagram (2) illustrating a process performed by the video image processing device according to the first embodiment.

The video image processing device 100 is a device that extracts a video image, which is related to the event information received from the terminal 50, from each of the pieces of the video image information acquired from the camera 10 and that concatenates the extracted video images. FIGS. 3 and 4 are schematic diagrams each illustrating a process performed by a video image processing device according to the first embodiment.

By using a known tracking technology, the video image processing device 100 judges, at time intervals, whether each of the players is included in which of the areas in the court 20. For example, the players in the team A are represented by the white circles and the players in the team B are represented by the hatched circles. In the example illustrated in FIG. 3, the video image processing device 100 judges, at "time t3", the players with the uniform numbers of (1), (2), and (3) in the team A and the player with the uniform number of (2) in the team B are included in the area A. Furthermore, the video image processing device 100 judges, at the time t3, that the players with the uniform numbers of (3), (4), and (5) in the team A and the players with the uniform numbers of (1), (4), and (5) in the team B are included in the area B.

In the state illustrated in FIG. 3, the user hopes to record the shoot scene of the player with the uniform number of (4) in the team A, operates the terminal 50, and inputs the items of "the uniform number (4) in the team A and the shoot". Then, the terminal 50 outputs the event information on "the uniform number (4) in the team A, the shoot, and the time t3" to the video image processing device 100.

The video image processing device 100 extracts the video image related to the event information on "the uniform number (4) in the team A, the shoot, and the time t3" from each of the pieces of the video image information acquired from the camera 10. For example, the area in which the player with "the uniform number (4) in the team A" is present at the "time t3" is the "area C" and the camera 10 that includes the area C in the image capturing range is the camera 10c. Consequently, as illustrated in FIG. 4, the video image processing device 100 extracts a partial video image 30c. The partial video image 30c is the video image that is included in the video image information, that is captured by the camera 10c, and that is the video image in the period of time between the time t3−M (s) and the time t3+N (s). The numerical values of M and N are numerical values that are appropriately set by the user.

The video image processing device 100 creates the video image information related to the event information by extracting, every time the video image processing device 100 receives the event information, the partial video image that is associated with the event information and concatenating each of the extracted partial video images.

Figure 5:
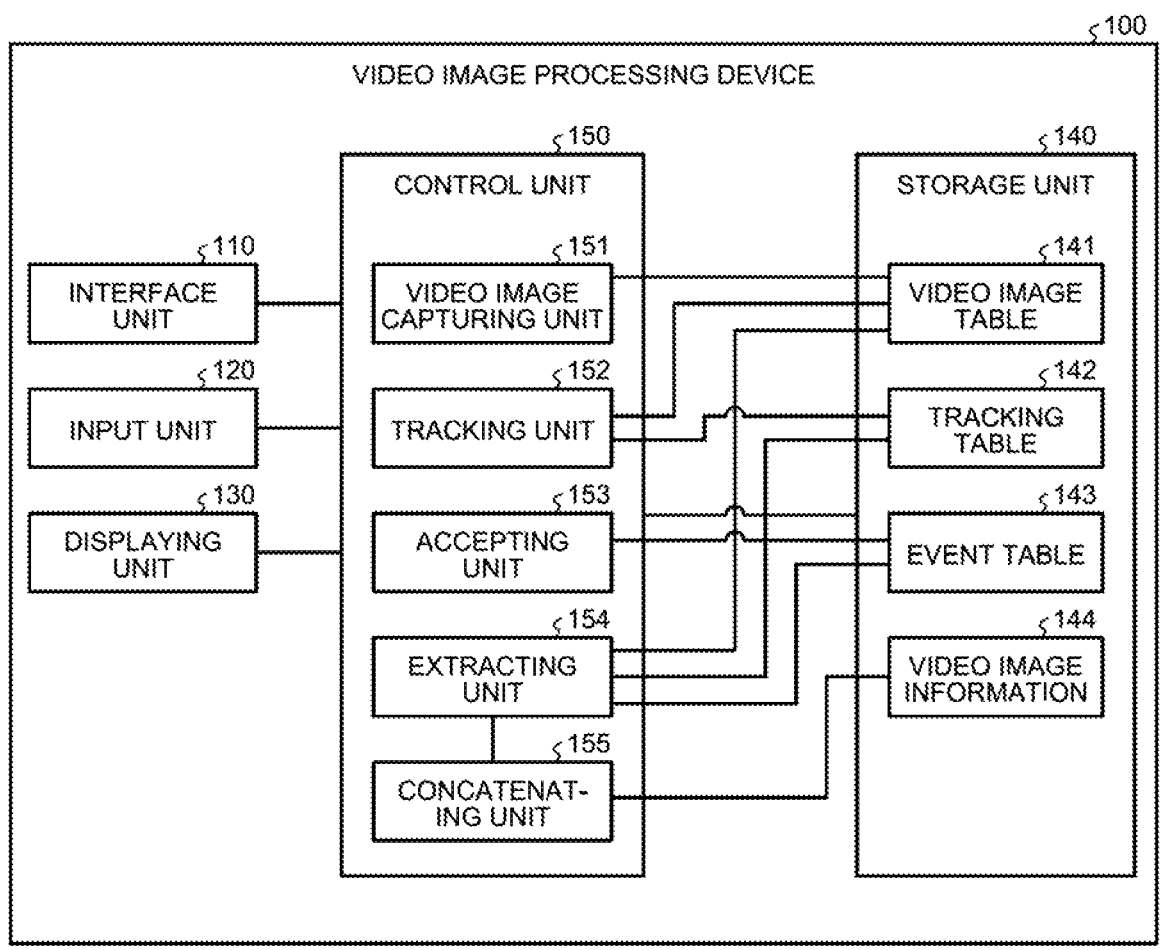
FIG. 5 is a functional block diagram illustrating the configuration of the video image processing device according to the first embodiment.

FIG. 5 is a functional block diagram illustrating the configuration of the video image processing device according to the first embodiment. As illustrated in FIG. 5, the video image processing device 100 includes an interface unit 110, an input unit 120, a displaying unit 130, a storage unit 140, and a control unit 150.

The interface unit 110 is a processing unit that is connected to the camera 10 and the terminal 50 in a wired or a wireless manner and that sends and receives data. The interface unit 110 receives the video image information from the camera 10 and outputs the received video image information to a video image capturing unit 151. Furthermore, the interface unit 110 receives the event information from the terminal 50 and outputs the received event information to an accepting unit 153. The control unit 150, which will be described later, receives data from the camera 10 and the terminal 50 via the interface unit 110.

The input unit 120 is an input device that is used to input various kinds of information to the video image processing device 100. The input unit 120 corresponds to, for example, a keyboard, a mouse, a touch panel, an input button, or the like.

The displaying unit 130 is a display device that displays information that is output from the control unit 150. For example, the displaying unit 130 corresponds to a display, a touch panel, or the like.

The storage unit 140 includes a video image table 141, a tracking table 142, an event table 143, and video image information 144. The storage unit 140 corresponds to, for example, a semiconductor memory device, such as a random access memory (RAM), a read only memory (ROM), a flash memory, or the like, or a storage device, such as a hard disk, an optical disk, or the like.

The video image table 141 is a table that stores therein the video image information received from the camera 10. FIG. 6 is a schematic diagram illustrating an example of the data structure of the video image table according to the first embodiment. As illustrated in FIG. 6, the video image table 141 stores therein, in an associated manner, camera identification information, area identification information, and video image information. The camera identification information is information that uniquely identifies the camera 10. The area identification information is information that uniquely identifies the area associated with the image capturing range of the camera 10. The video image information is video image information on a video image captured by the camera 10. For example, the information indicating that the image capturing range of the camera 10a is the area A is registered in the video image table 141 illustrated in the FIG. 6.

The tracking table 142 is a table that holds the tracking information on each of the players. FIG. 7 is a schematic diagram illustrating an example of the data structure of the tracking table. As illustrated in FIG. 7, the tracking table 142 associates the player identification information with the tracking information. The player identification information is information that uniquely identifies a player. The tracking information is information indicating, at time intervals, that the player identified by the player identification information is present in which of the areas from among each of the areas A to D.

The event table 143 is a table that holds each of the pieces of the event information that are received from the terminal 50. FIG. 8 is a schematic diagram illustrating an example of the data structure of the event table. As illustrated in FIG. 8, the event table 143 associates the time, the player identification information, and the action identification information. The descriptions related to the time, the player identification information, and the action identification information are the same as those of the event information described above.

The video image information 144 is video image information that is created by being concatenated with the partial video images that are associated with the event information.

The control unit 150 includes the video image capturing unit 151, a tracking unit 152, the accepting unit 153, an extracting unit 154, and a concatenating unit 155. The control unit 150 corresponds to, for example, an integrated device, such as an application specific integrated circuit (ASIC), a field programmable gate array (FPGA), or the like. Furthermore, the control unit 150 corresponds to, for example, an electronic circuit, such as a CPU, a micro processing unit (MPU), or the like.

The video image capturing unit 151 is a processing unit that receives the video image information from the camera 10 via the interface unit 110. The video image capturing unit 151 stores, in an associated manner in the video image table 141, the camera identification information and the video image information. Furthermore, it is assumed that the camera identification information that indicates the transmission source of the video image information is attached to the video image information that is acquired from the camera 10.

The tracking unit 152 is a processing unit that creates tracking information by analyzing, by using a known tracking technology, the video image information stored in the video image table 141 and judging, at time intervals, whether each of the players is included in which of the areas in the court 20. The known technology used is, for example, Kentaro TSUJI, etc. "Robus Human Tracking Using Occlusion-free Images from Multiple Video Cameras" IAPR Conference on Machine Vision Applications, Jun. 13-15, 2011, Nara, JAPAN. The tracking unit 152 associates the player identification information with the tracking information and stores the associated information in the tracking table 142.

The accepting unit 153 is a processing unit that receives, from the terminal 50, information indicating whether the event information has occurred. For example, if the accepting unit 153 receives the event information from the terminal 50, the accepting unit 153 judges that an event has occurred. The accepting unit 153 registers the event information in the event table 143.

The extracting unit 154 is a processing unit that judges, when an event occurs, the camera 10 that includes the area, in which an event has occurred, in the court 20 in the image capturing range and that extracts the partial video image obtained at the time at which the event has occurred from the video image information on the video image that is captured by the judged camera. The extracting unit 154 outputs the information on the extracted partial video image to the concatenating unit 155. The extracting unit 154 repeats the process described above every time the event occurs.

For example, the extracting unit 154 acquires unselected event information from the event table 143 and compares the player identification information and the time included in the event information with the tracking information included in the tracking table 142. Furthermore, on the basis of the comparison described above, the extracting unit 154 specifies the area in which the player who is identified by the player identification information is positioned at the time that is stored in the event information and then compares the specified area with the video image table 141, whereby the extracting unit 154 specifies the camera that includes the specified area in the image capturing range.

The extracting unit 154 acquires, from the video image table 141, the video image information that is associated with the camera identification information on the specified camera 10 and extracts the partial video image from the acquired video image information. The partial video image becomes, as described with reference to FIG. 4, the video image in the period of time between the time t−M (s) and the time t+N (s) by using the time t in the event information as a reference. By repeatedly performing the process described above on each of the pieces of the event information stored in the event table 143, the extracting unit 154 extracts information on the plurality of partial video images and outputs the partial video images to the concatenating unit 155. Furthermore, the extracting unit 154 may also attach the subject event information to each of the partial video images as a tag.

The concatenating unit 155 is a processing unit that creates the video image information 144 by concatenating the partial video images extracted by the extracting unit 154. The concatenating unit 155 may concatenate each of the partial video images in any manner. For example, the concatenating unit 155 may also concatenate each of the partial video images in time series, may also concatenate the partial video image for each of the pieces of the player identification information, or may also concatenate the partial video image for each of the pieces of the action type information. The concatenating unit 155 stores the video image information 144 in the storage unit 140.

Figure 9:
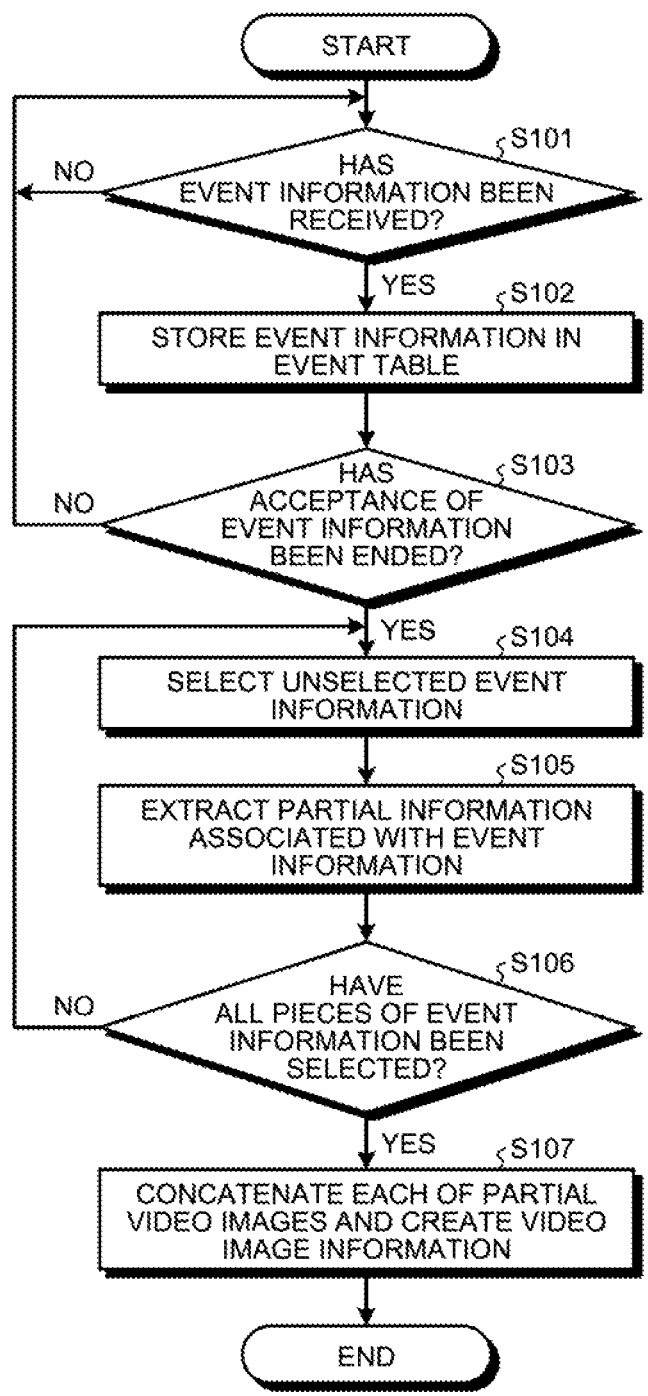
FIG. 9 is a flowchart illustrating the flow of a process performed by the video image processing device according to the first embodiment.

In the following, the flow of a process performed by the video image processing device 100 according to the first embodiment will be described. FIG. 9 is a flowchart illustrating the flow of a process performed by the video image processing device according to the first embodiment. As illustrated in FIG. 9, the accepting unit 153 in the video image processing device 100 judges whether the accepting unit 153 has accepted the event information (Step S101). If the accepting unit 153 has not accepted the event information (No at Step S101), the accepting unit 153 proceeds to Step S101.

In contrast, if the accepting unit 153 has accepted the event information (Yes at Step S101), the accepting unit 153 stores the event information in the event table 143 (Step S102). If the accepting unit 153 does not end the acceptance of the event information (No at Step S103), the accepting unit 153 proceeds to Step S101. If the accepting unit 153 ends the acceptance of the event information (Yes at Step S103), the accepting unit 153 proceeds to Step S104.

The extracting unit 154 in the video image processing device 100 selects unselected event information from the event table 143 (Step S104). The extracting unit 154 extracts the partial information associated with the event information from the video image table 141 (Step S105). If the extracting unit 154 has not selected all of the pieces of the event information (No at Step S106), the extracting unit 154 proceeds to Step S104.

In contrast, if the extracting unit 154 has selected all of the pieces of the event information (Yes at Step S106), the extracting unit 154 proceeds to Step S107. The concatenating unit 155 in the video image processing device 100 concatenates each of the partial video images and creates the video image information 144 (Step S107).

In the following, the effect of the video image processing device 100 according to the first embodiment will be described. When the video image processing device 100 receives the event information from the terminal 50, the video image processing device 100 judges that an event has occurred, extracts the partial video image associated with the event information, and creates the video image information 144. Consequently, the video image processing device 100 can create the video image information that includes therein the partial information related to the event information.

Furthermore, a description has been given of a case of the video image processing device 100 according to the first embodiment in which the event information includes therein the player identification information, the action identification information, and the time; however, the embodiment is not limited to this. For example, in addition to the player identification information, a user may also further select the information indicating the player associated with the player identification information is present in which of the areas and may also notify the video image processing device 100 of the result. In this case, the event information includes therein the player identification information, the action identification information, the time, and the area identification information. In this way, if the area identification information is included in the event information, the video image processing device 100 can specify the area in which the player is positioned and that is identified by the player identification information at the time that is included in the event information, even if the tracking information is not present.

[b] Second Embodiment

Figure 10:
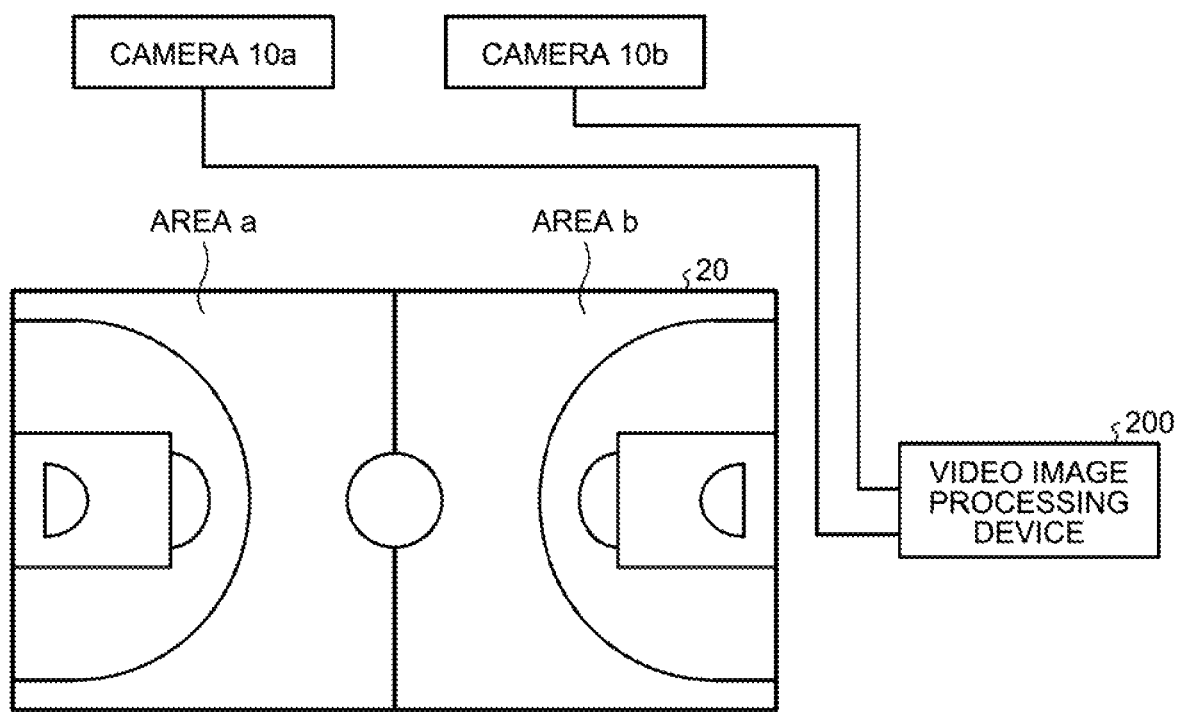
FIG. 10 is a schematic diagram illustrating the configuration of a system according to a second embodiment.

FIG. 10 is a schematic diagram illustrating the configuration of a system according to a second embodiment. As illustrated in FIG. 10, this system includes the cameras 10a and 10b and a video image processing device 200. The cameras 10a and 10b and the video image processing device 200 are connected with each other. In the second embodiment, in a description below, the cameras 10a and 10b are appropriately referred to as the camera 10 as a group.

The camera 10 is a device that captures a video image in the image capturing range and that sends information on the captured video image to the video image processing device 200. The information on the video image is information that includes therein continuous images at time intervals. In a description below, the information on the video image is referred to as the video image information. The camera 10 is arranged in the court 20 in which various kinds of competitions are held.

The camera 10a is a camera that includes an area a in the court 20 as the image capturing range. The camera 10b is a camera that includes an area b in the court 20 as the image capturing range.

The video image processing device 200 is a device that compares the number of players present in the area a with the number of players present in the area b, that extracts the video image of the camera 10 that captures the area on the side in which the number of players is greater, and that concatenates the extracted video images.

Figure 11:
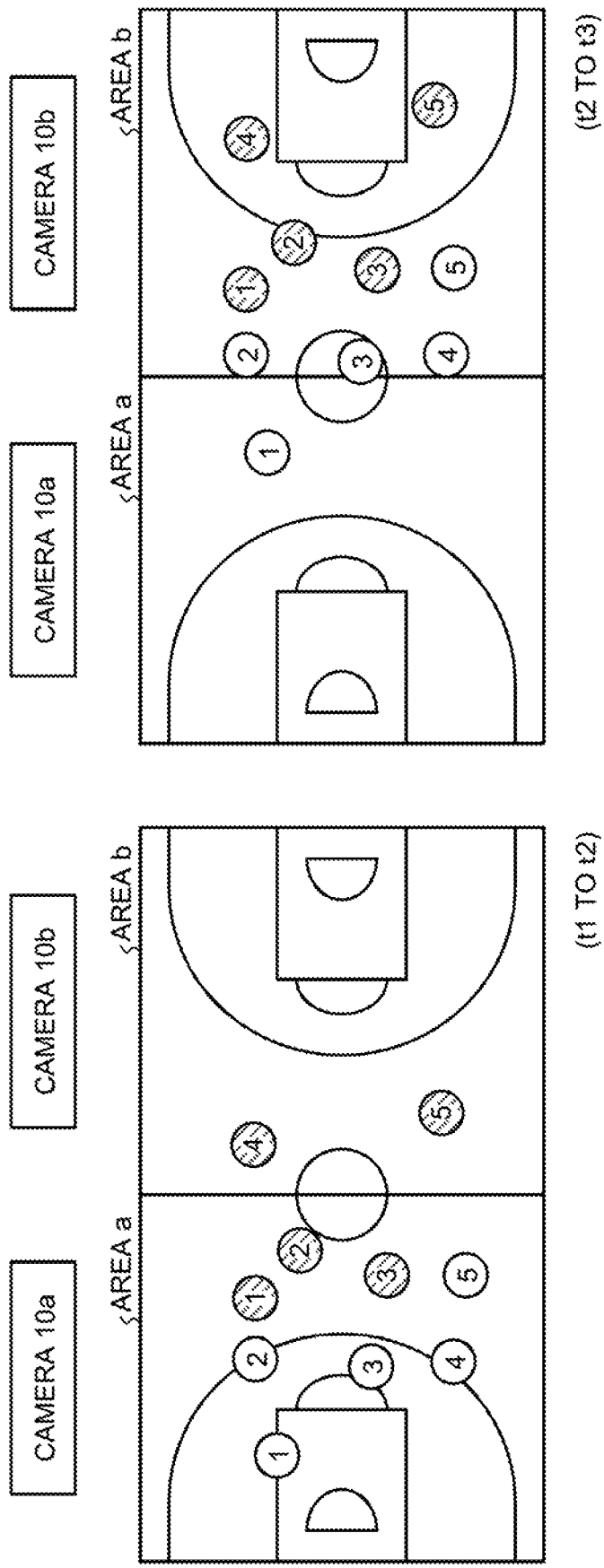
FIG. 11 is a schematic diagram illustrating a process performed by a video image processing device according to the second embodiment.

FIG. 11 is a schematic diagram illustrating a process performed by the video image processing device according to the second embodiment. For example, in the period of time between the time t1 and the time t2, eight players are present in the area a and two players are present in the area b. Consequently, because the number of players in the area a is greater than the number of players in the area b, the video image processing device 200 extracts, in the period of time between the time t1 and the time t2, a partial video image A captured by the camera 10a.

Subsequently, in the period of time between the time t2 and the time t3, a single player is present in the area a and nine players are present in the area b. Consequently, because the number of players in the area b is greater than the number of players in the area a, the video image processing device 200 extracts a partial video image B captured by the camera 10b in the period of time between the time t2 and the time t3. The video image processing device 200 creates the video image information by concatenating the partial video image A and the partial video image B.

Figure 12:
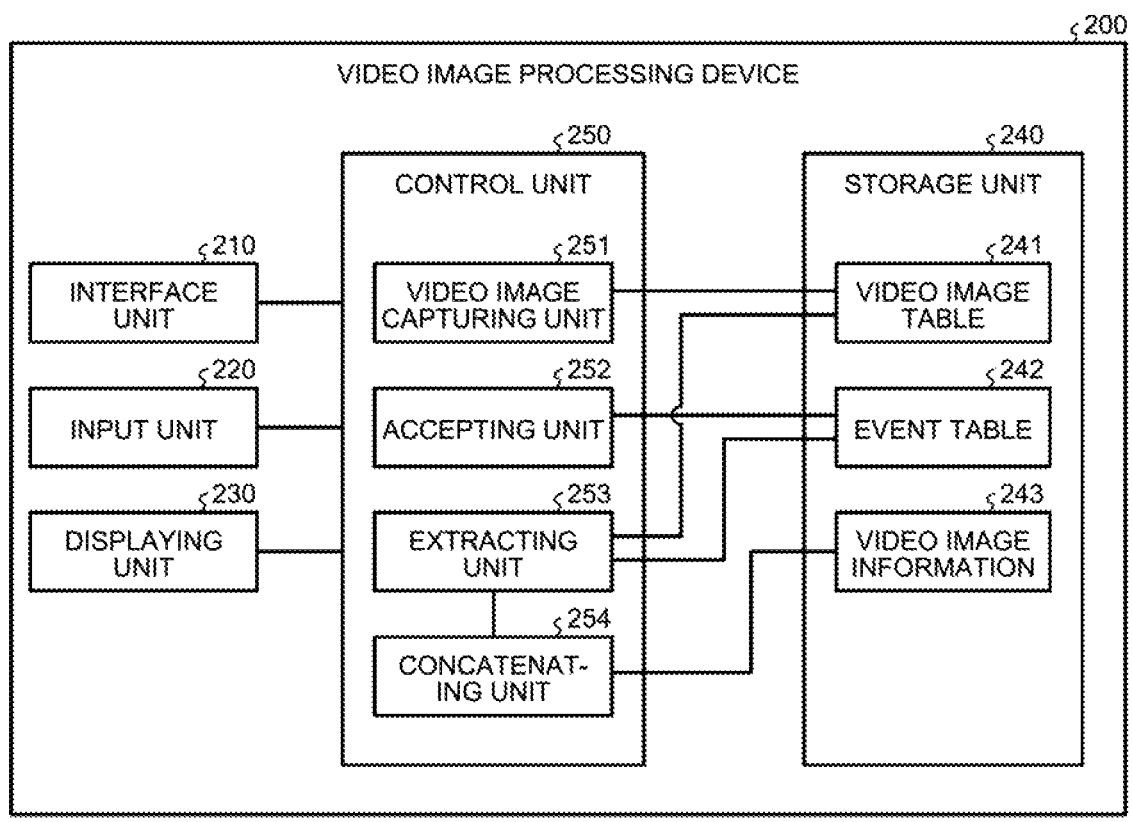
FIG. 12 is a functional block diagram illustrating the configuration of the video image processing device according to the second embodiment.

FIG. 12 is a functional block diagram illustrating the configuration of the video image processing device according to the second embodiment. As illustrated in FIG. 12, the video image processing device 200 includes an interface unit 210, an input unit 220, a displaying unit 230, a storage unit 240, and a control unit 250.

The interface unit 210 is a processing unit that is connected to the camera 10 in a wired or a wireless manner and that sends and receives data. The interface unit 210 receives the video image information from the camera 10 and outputs the received video image information to a video image capturing unit 251.

The input unit 220 is an input device that is used to input various kinds of information to the video image processing device 200. The input unit 220 corresponds to, for example, a keyboard, a mouse, a touch panel, an input button, or the like.

The displaying unit 230 is a display device that displays information that is output from the control unit 250. For example, the displaying unit 230 corresponds to a display, a touch panel, or the like.

The storage unit 240 includes a video image table 241, an event table 242, and video image information 243. The storage unit 240 corresponds to, for example, a semiconductor memory device, such as a RAM, a ROM, a flash memory, or the like, or a storage device, such as a hard disk, an optical disk, or the like.

The video image table 241 is a table that stores therein the video image information received from the camera 10. FIG. 13 is a schematic diagram illustrating an example of the data structure of the video image table according to the second embodiment. As illustrated in FIG. 13, the video image table 241 stores therein, in an associated manner, the camera identification information, the area identification information, and the video image information. The camera identification information is information that uniquely identifies the camera 10. The area identification information is information that uniquely identifies the area associated with the image capturing range of the camera 10. The video image information is video image information on the video image captured by the camera 10. For example, the information indicating that the image capturing range of the camera 10a is the area a is registered in the video image table 241 illustrated in FIG. 13.

The event table 242 is a table that holds the event information. Here, in the second embodiment, as an example, the video image processing device 200 judges that an event has occurred at the timing in which a change has occurred in the magnitude relationship between the number of players in the area a and the number of players in the area b. Furthermore, the event information is information in which a period of time is associated with the area identification information. FIG. 14 is a schematic diagram illustrating an example of the data structure of an event table according to the second embodiment. The period of time is information indicating a period of time between the time at which the event this time has occurred and the time at which the next event occurs. The area identification information is information that uniquely identifies the area on the side in which the number of players is greater at the subject period of time. For example, FIG. 14 indicates that, in the period of time between the time t1 and the time t2, the number of players in the area a is greater than the number of players in the area b. Furthermore, FIG. 14 indicates that, at the time t2, the magnitude relationship between the number of players in the area a and the number of players in the area b is changed and indicates that, in the period of time between the time t2 and the time t3, the number of players in the area b is greater than the number of players in the area a.

The video image information 243 is video image information that is created by being concatenated with the partial video images that are associated with the event information.

The control unit 250 includes the video image capturing unit 251, an accepting unit 252, an extracting unit 253, and a concatenating unit 254. The control unit 250 corresponds to, for example, an integrated device, such as an ASIC, an FPGA, or the like. Furthermore, the control unit 250 corresponds to, for example, an electronic circuit, such as a CPU, an MPU, or the like.

The video image capturing unit 251 is a processing unit that receives the video image information from the camera 10 via the interface unit 210. The video image capturing unit 251 stores, in an associated manner in the video image table 241, the camera identification information and the video image information. Furthermore, it is assumed that the camera identification information that indicates the transmission source of the video image information is attached to the video image information that is acquired from the camera 10.

The accepting unit 252 is a processing unit that refers to each of the pieces of the video image information in the video image table 241 and judges that the occurrence of an event has been accepted at the time at which the magnitude relationship between the number of players in the area a and the number of players in the area b is changed. When the accepting unit 252 accepted the occurrence of the event, the accepting unit 252 creates the event information and registers the event information in the event table 242. The event information is information in which a period of time is associated with the area identification information. The period of time is information indicating a period of time between the time at which the event this time has occurred and the time at which the next event occurs. The area identification information is information that uniquely identifies the area on the side of the greater number of players at the subject period of time. Furthermore, if the accepting unit 252 receives the occurrence of the first event, the accepting unit 252 waits for the process of creating the event information until the next event occurs.

The accepting unit 252 may judge the magnitude relationship between the number of players in the area a and the number of players in the area b by using any method. For example, the accepting unit 252 may also compare the number of players by performing the template matching, detecting a player from each of the pieces of the video image information on the images captured by the cameras 10a and 10b, and counting the number of detected players. Furthermore, the accepting unit 252 may also count the number of players present in the areas a and b by performing a tracking process described in the first embodiment.

the extracting unit 253 is a processing unit that judges, if an event occurs, the camera 10 that includes the area, in which the event has occurred, in the court 20 as the image capturing range and that extracts the partial video image, in which the event has occurred, at the period of time from the video image information on the video image captured by the judged camera. The extracting unit 253 outputs the information on the extracted partial video image to the concatenating unit 254. The extracting unit 253 repeats the process described above every time an event occurs.

For example, the extracting unit 253 acquires unselected event information from the event table 242. The extracting unit 253 acquires the video image information associated with area identification information included in the event information from the video image table. Furthermore, the extracting unit 253 extracts the partial video image, at a period of time, included in the event information from the acquired video image information. By repeatedly performing the process described above on each of the pieces of the event information stored in the event table 242, the extracting unit 253 extracts the information on the plurality of the partial video images and outputs the extracted information to the concatenating unit 254.

The concatenating unit 254 is a processing unit that creates the video image information 243 by concatenating the partial video images extracted by the extracting unit 253. The concatenating unit 254 may also concatenate each of the partial video images by using any method. For example, the concatenating unit 254 may also each of the partial video images in time series. The concatenating unit 254 stores the video image information 243 in the storage unit 240.

Figure 15:
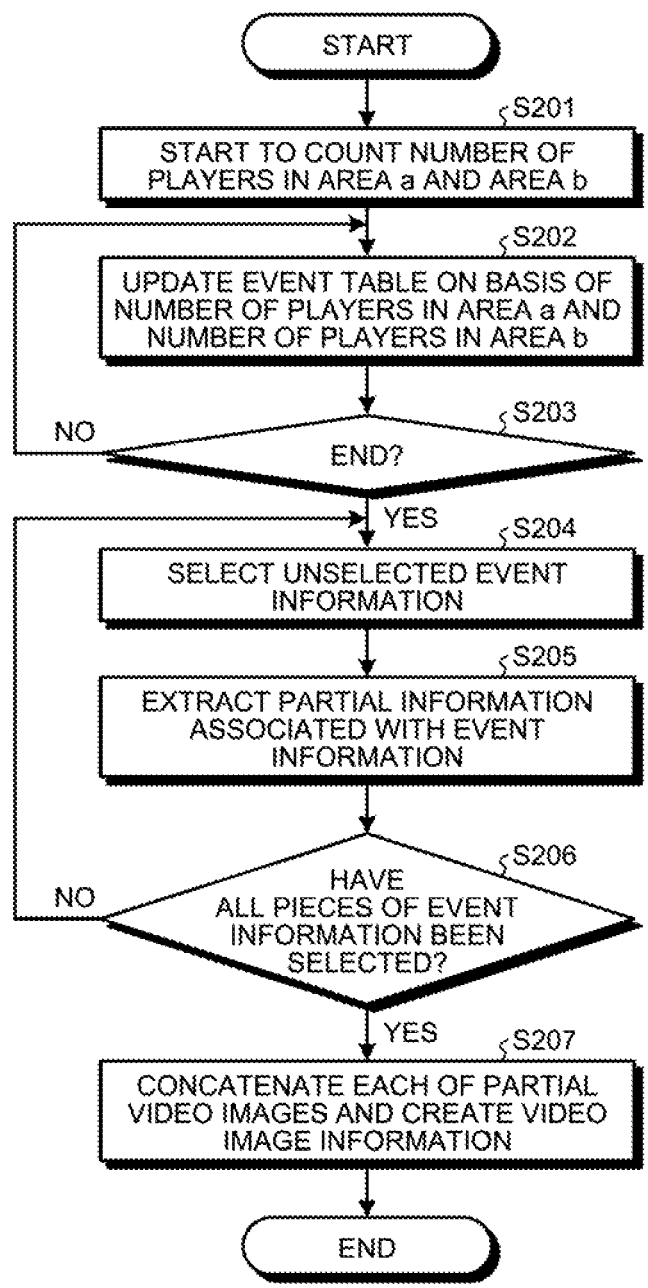
FIG. 15 is a flowchart illustrating the flow of a process performed by the video image processing device according to the second embodiment.

In the following, the flow of the process performed by the video image processing device 200 according to the second embodiment will be described. FIG. 15 is a flowchart illustrating the flow of the process performed by the video image processing device according to the second embodiment. As illustrated in FIG. 15, the accepting unit 252 in the video image processing device 200 start to count the number of players in the area a and the area b (Step S201).

The accepting unit 252 updates the event table 242 on the basis of the number of players in the area a and the number of players in the area b (Step S202). At Step S202, the accepting unit 252 refers to each of the pieces of the video image information in the video image table 241 and judges that the occurrence of the event was accepted at the time of the occurrence of a change in the magnitude relationship between the number of players in the area a and the number of players in the area b. Furthermore, if the accepting unit 252 receives the occurrence of the event, the accepting unit 252 creates the event information and registers the event information in the event table 242.

The accepting unit 252 judges whether an update of the event table 242 is ended (Step S203). If the accepting unit 252 does not end the update of the event table 242 (No at Step S203), the accepting unit 252 proceeds to Step S202. If the accepting unit 252 ends the update of the event table 242 (Yes at Step S203), the accepting unit 252 proceeds to Step S204.

The extracting unit 253 in the video image processing device 200 selects unselected event information from the event table 242 (Step S204). The extracting unit 253 extracts the partial information associated with the event information from the video image table 241 (Step S205). If the extracting unit 253 has not selected all of the pieces of the event information (No at Step S206), the extracting unit 253 proceeds to Step S204.

In contrast, if the extracting unit 253 has selected all of the pieces of the event information (Yes at Step S206), the extracting unit 253 proceeds to Step S207. The concatenating unit 254 in the video image processing device 200 concatenates each of the partial video images and creates the video image information 243 (Step S207).

In the following, the effect of the video image processing device 200 according to the second embodiment will be described. The video image processing device 200 judges that an event has occurred at the time of the occurrence of a change in the magnitude relationship between the number of players in the area a and the number of players in the area b, extracts the partial video image in the area in which the number of players is greater between the areas a and b, and creates the video image information 243. Consequently, it is possible to efficiently create the video image information on the video images of many players plays.

[c] Third Embodiment

Figure 16:
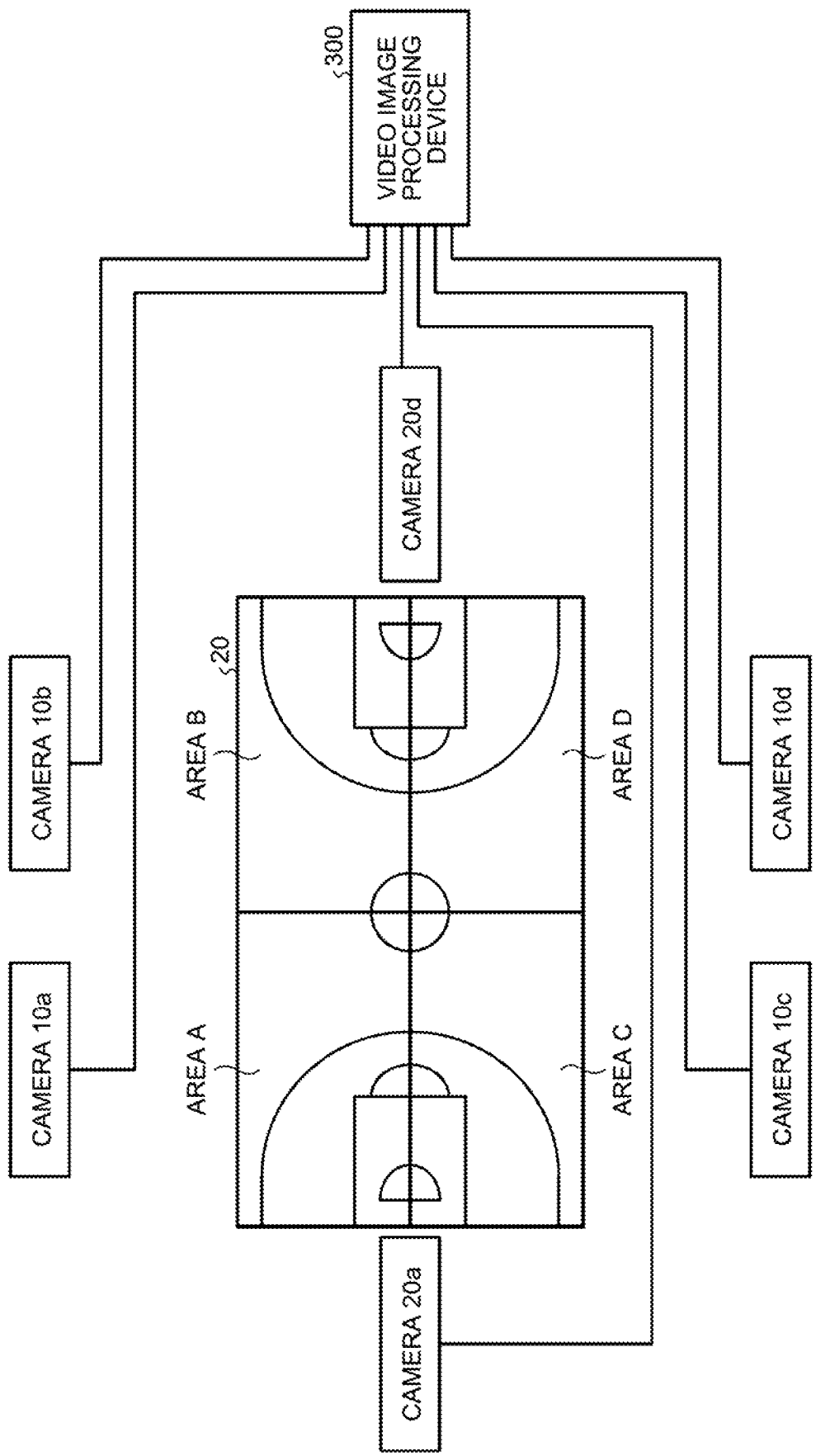
FIG. 16 is a schematic diagram illustrating the configuration of a system according to a third embodiment.

FIG. 16 is a schematic diagram illustrating the configuration of a system according to a third embodiment. As illustrated in FIG. 16, this system includes the cameras 10a, 10b, 10c, 10d, 20a, and 20b and a video image processing device 300. The cameras 10a to 10d, and 20a and 20b and the video image processing device 300 are connected with each other. In the third embodiment, in a description below, the cameras 10a to 10d are collectively referred to as the camera 10. Furthermore, the cameras 20a and 20b are collectively referred to as a camera 25.

The camera 10 is a device that captures a video image in the image capturing range and that sends information on the captured video image to the video image processing device 300. The information on the video image is information on continuous images at time intervals. In a description below, the information on the video image is referred to as video image information. The camera 10 is arranged on the court 20 in which various kinds of competitions are held.

The camera 10a is a camera that includes the area A in the court 20 as the image capturing range. The camera 10b is a camera that includes the area B in the court 20 as the image capturing range. The camera 10c is a camera that includes the area C in the court 20 as the image capturing range. The camera 10d is a camera that includes the area D in the court 20 as the image capturing range.

The camera 25 is arranged in the vicinity of a basket goal or the like and is set such that a partial region through which only a shooted ball passes is included in the image capturing range. The camera 25 captures a video image in the image capturing range and sends the information on the captured video image to the video image processing device 300.

The video image processing device 300 detects a shoot scene made by a player on the basis of the video image information obtained by the camera 25. If the video image processing device 300 detects the shoot scene, the video image processing device 300 judges that an event has occurred; judges the camera 10 that includes the area, in which the event has occurred, in the image capturing range; extracts the partial video image obtained at the time at which the event has occurred from the video image information on the video image captured by the judged camera; and concatenates the extracted partial video image.

Figure 17:
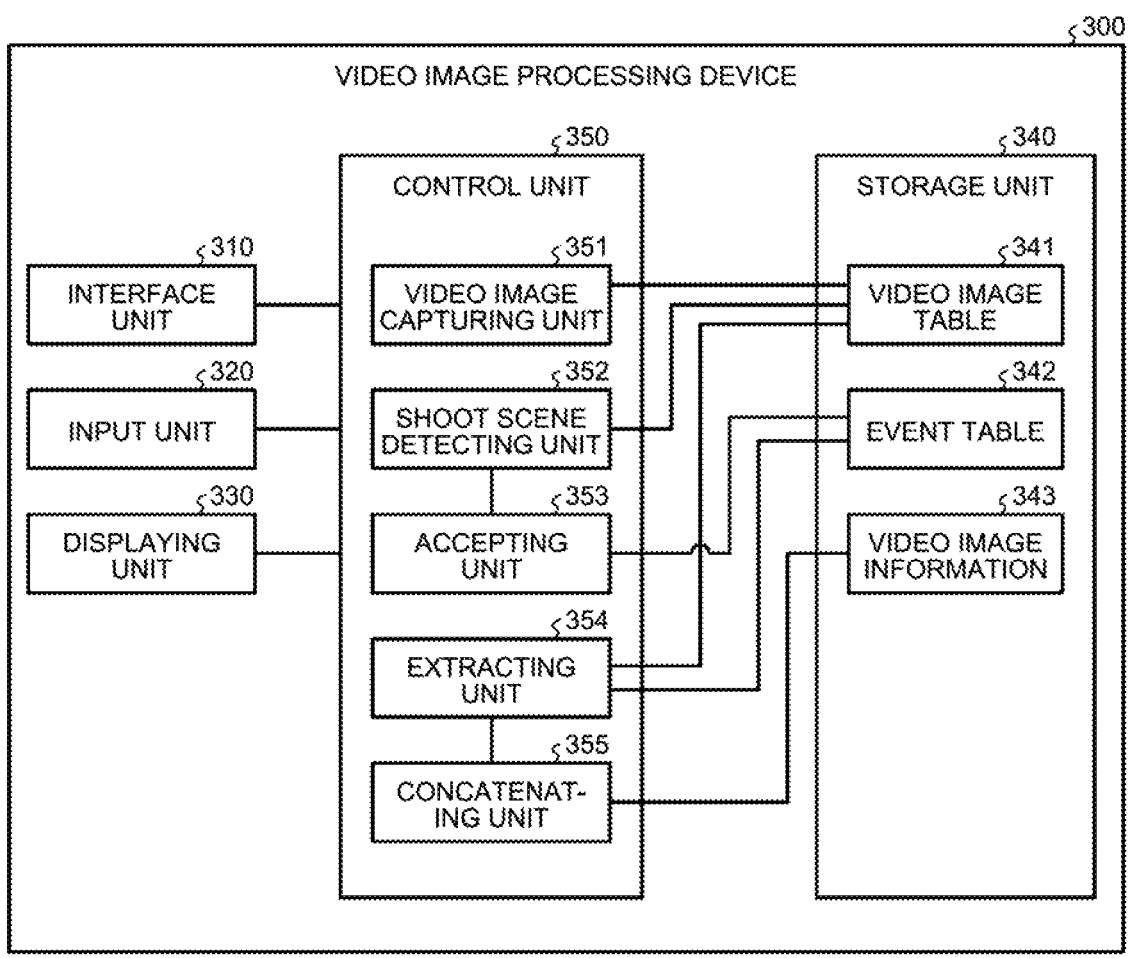
FIG. 17 is a functional block diagram illustrating the configuration of a video image processing device according to the third embodiment.

FIG. 17 is a functional block diagram illustrating the configuration of a video image processing device according to the third embodiment. As illustrated in FIG. 17, the video image processing device 300 includes an interface unit 310, an input unit 320, a displaying unit 330, a storage unit 340, and a control unit 350.

The interface unit 310 is a processing unit that is connected to the cameras 10 and 20 in a wired or a wireless manner and that sends and receives data. The interface unit 310 receives the video image information from the cameras 10 and 20 and outputs the received video image information to a video image capturing unit 351.

The input unit 320 is an input device that is used to input various kinds of information to the video image processing device 300. The input unit 320 corresponds to, for example, a keyboard, a mouse, a touch panel, an input button, or the like.

The displaying unit 330 is a display device that displays information that is output from the control unit 350. For example, the displaying unit 330 corresponds to a display, a touch panel, or the like.

The storage unit 340 includes a video image table 341, an event table 342, and a video image information 343. The storage unit 340 corresponds to, for example, a semiconductor memory device, such as a RAM, a ROM, a flash memory, or the like, or a storage device, such as a hard disk, an optical disk, or the like.

The video image table 341 is a table that stores therein the video image information received from the cameras 10 and 20. FIG. 18 is a schematic diagram illustrating an example of the data structure of a video image table according to the third embodiment. As illustrated in FIG. 18, the video image table 341 associates the camera identification information, the area identification information, and the video image information. The camera identification information is information that uniquely identifies the cameras 10 and 20. The area identification information is information that uniquely identifies the area associated with the image capturing range of the cameras 10 and 20. The video image information is video image information on the video image captured by each of the cameras 10 and 20. The video image information on the cameras 20a and 20b illustrated in FIG. 18 is used when a shoot scene, which will be described later, is detected.

The event table 342 is a table that holds the event information. Here, in the third embodiment, as an example, the video image processing device 300 judges that an event has occurred at the timing in which the shoot scene is detected. Furthermore, the event information is information in which the time is associated with the area identification information. FIG. 19 is a schematic diagram illustrating an example of the data structure of the event table according to the third embodiment. The time indicates the timing in which the shoot scene has occurred. The area identification information is information that uniquely identifies the area in which the shot player is located.

The video image information 343 is video image information that is created by being concatenated with the partial video images that are associated with the event information.

The control unit 350 includes the video image capturing unit 351, a shoot scene detecting unit 352, an accepting unit 353, an extracting unit 354, and a concatenating unit 355. The control unit 350 corresponds to, for example, an integrated device, such as an ASIC, an FPGA, or the like. Furthermore, the control unit 350 corresponds to, for example, an electronic circuit, such as a CPU, an MPU, or the like.

The video image capturing unit 351 is a processing unit that receives the video image information from the cameras 10 and 20 via the interface unit 310. The video image capturing unit 351 associates the camera identification information with the video image information and stores the associated information in the video image table 341. Furthermore, it is assumed that the camera identification information indicating the transmission source of the video image information is attached to the video image information that is acquired by the cameras 10 and 20.

The shoot scene detecting unit 352 is a processing unit that detects a shoot scene on the basis of the video image information on the video image captured by the camera 25 and that specifies the area in which the shot player is present.

The shoot scene detecting unit 352 outputs, to the accepting unit 353, the time at which the shoot scene is detected and the area identification information that specifies the area in which the shot player is located.

In the following, an example of a process performed by the shoot scene detecting unit 352 will be described. FIG. 20 is a schematic diagram illustrating a process performed by the shoot scene detecting unit. The shoot scene detecting unit 352 sets a partial region 40a through which only the ball that is shot by the player passes to an image frame 40. For example, the partial region 40a is set in the vicinity of a basket goal 40b.

The shoot scene detecting unit 352 judges whether a ball is present in the partial region 40a. For example, the shoot scene detecting unit 352 judges, by using a template in which the shape and the size of the ball are judged, whether a ball is present in the partial region 40a. In the example illustrated in FIG. 20, the shoot scene detecting unit 352 detects a ball 5 from the partial region 40a. When the shoot scene detecting unit 352 detects the ball 5 from the partial region 40a, the shoot scene detecting unit 352 calculates the three-dimensional coordinates of the ball 5 on the basis of the principle of a stereo image.

If the shoot scene detecting unit 352 detects the ball 5 from the partial region 40a, the shoot scene detecting unit 352 acquires an image frame 41 that is one or two frames before the image frame 40 and detects the ball 5 from the image frame 41. The shoot scene detecting unit 352 calculates, on the basis of the principle of the stereo image, the three-dimensional coordinates of the ball 5 detected from the image frame 41.

The shoot scene detecting unit 352 may also detect the ball 5 from the image frame 41 by using the position of the ball 5 detected from the image frame 40 as a clue. The shoot scene detecting unit 352 estimates a trajectory 5a of the ball 5 on the basis of the three-dimensional coordinates of each of the balls 5 detected from the image frames 40 and 41. The shoot scene detecting unit 352 estimates, on the basis of the trajectory 5a, a start position 6 of the trajectory 5a and the time at which the ball 5 was present in the start position 6. The time mentioned here corresponds to the time at which the shoot scene is detected.

The shoot scene detecting unit 352 acquires an image frame 42 associated with the time and detects the ball 5 from the start position 6. The shoot scene detecting unit 352 calculates, on the basis of the principle of the stereo image, the three-dimensional coordinates of the ball 5 detected from the image frame 42. The shoot scene detecting unit 352 creates the area identification information by comparing the three-dimensional coordinates of the ball 5 with the coordinates that designates the range of each of the previously set areas A to D and specifying the area that is associated with the start position 6.

A description will be given here by referring back to FIG. 17. If the shoot scene detecting unit 352 detects a shoot scene and acquires the time and the area identification information from the shoot scene detecting unit 352, the accepting unit 353 judges that an event has occurred. The accepting unit 353 stores, in the event table 342, the event information in which the time at which the shoot scene is detected is associated with the area identification information. The accepting unit 353 stores the event information in the event table 342 every time the shoot scene is detected by the shoot scene detecting unit 352.

The extracting unit 354 is a processing unit that judges, if an event has occurred, the camera 10 that includes, in the image capturing range, the area that is included in the court 20 and in which the event has occurred and that extracts, from the video image information on the video image captured by the judged camera, the partial video image at the time at which the event has occurred. The extracting unit 354 outputs the information on the extracted partial video image to the concatenating unit 355. The extracting unit 354 repeatedly performs the process described above every time an event occurs.

For example, the extracting unit 354 acquires unselected event information from the event table 342, compares the area identification information included in the event information with the video image table 341, and specifies the camera 10 that includes, in the image capturing range, the area that includes the shot player.

The extracting unit 354 acquires, from the video image table 341, the video image information that is associated with the camera identification information on the specified camera 10 and extracts the partial video image from the acquired video image information. The partial video image becomes, as described with reference to FIG. 4, the video image in the period of time between the time t–M (s) and the time t+N (s) by using the time t in the event information as a reference. By repeatedly performing the process described above on each of the pieces of the event information stored in the event table 342, the extracting unit 354 extracts information on the plurality of partial video images and outputs the video images to the concatenating unit 355.

The concatenating unit 355 is a processing unit that creates the video image information 343 by concatenating the partial video images extracted by the extracting unit 354. The concatenating unit 355 may also concatenate each of the partial video images in any manner. For example, the concatenating unit 355 may also concatenate each of the partial video images in time series. The concatenating unit 355 stores the video image information 343 in the storage unit 340.

Figure 21:
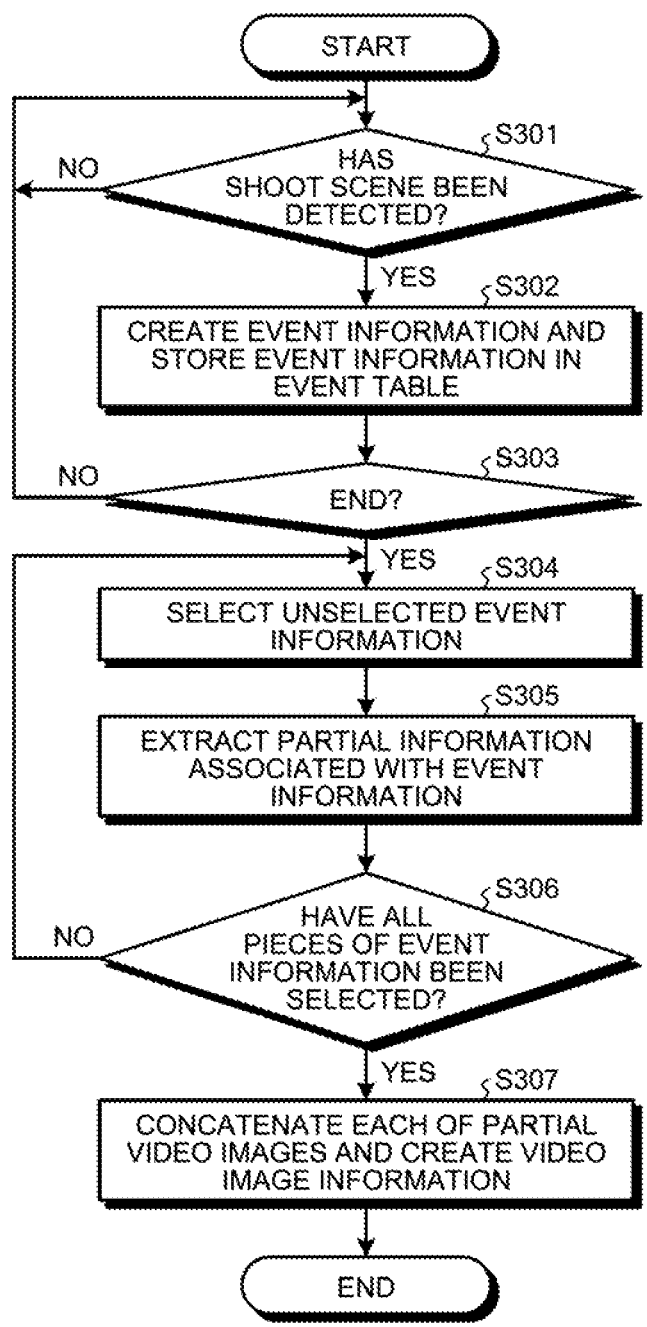
FIG. 21 is a flowchart illustrating the flow of a process performed by the video image processing device according to the third embodiment.

In the following, the flow of the process performed by the video image processing device 300 according to the third embodiment will be described. FIG. 21 is a flowchart illustrating the flow of a process performed by the video image processing device according to the third embodiment. As illustrated in FIG. 21, the shoot scene detecting unit 352 in the video image processing device 300 judges whether a shoot scene has been detected (Step S301). If the shoot scene detecting unit 352 has not detected the shoot scene (No at Step S301), the shoot scene detecting unit 352 proceeds to Step S301. If the shoot scene detecting unit 352 has detected the shoot scene (Yes at Step S301), the shoot scene detecting unit 352 proceeds to Step S302.

If the shoot scene has been detected, the accepting unit 353 in the video image processing device 300 creates the event information and registers the created event information in the event table 342 (Step S302). The shoot scene detecting unit 352 judges whether the shoot scene detecting unit 352 ends the detection of the shoot scene (Step S303). If the shoot scene detecting unit 352 does not end the detection of the shoot scene (No at Step S303), the shoot scene detecting unit 352 proceeds to Step S301. If the shoot scene detecting unit 352 ends the detection of the shoot scene (Yes at Step S303), the shoot scene detecting unit 352 proceeds to Step S304.

The extracting unit 354 in the video image processing device 300 selects the unselected event information from the event table 342 (Step S304). The extracting unit 354 extracts the partial information associated with the event information from the video image table 341 (Step S305). If the extracting unit 354 has not selected all of the pieces of the event information (No at Step S306), the extracting unit 354 proceeds to Step S304.

In contrast, if the extracting unit 354 has selected all of the pieces of the event information (Yes at Step S306), the extracting unit 354 proceeds to Step S307. The concatenating unit 355 in the video image processing device 300 creates the video image information 343 by concatenating each of the partial video images (Step S307).

In the following, the effect of the video image processing device 300 according to the third embodiment will be described. If the shoot scene is detected, the video image processing device 300 judges that an event has occurred, extracts a partial video image in the area in which the shot player is present, and creates the video image information 343. Consequently, it is possible to efficiently create the video image information in which shoot scenes are collected.

[d] Fourth Embodiment

Figure 22:
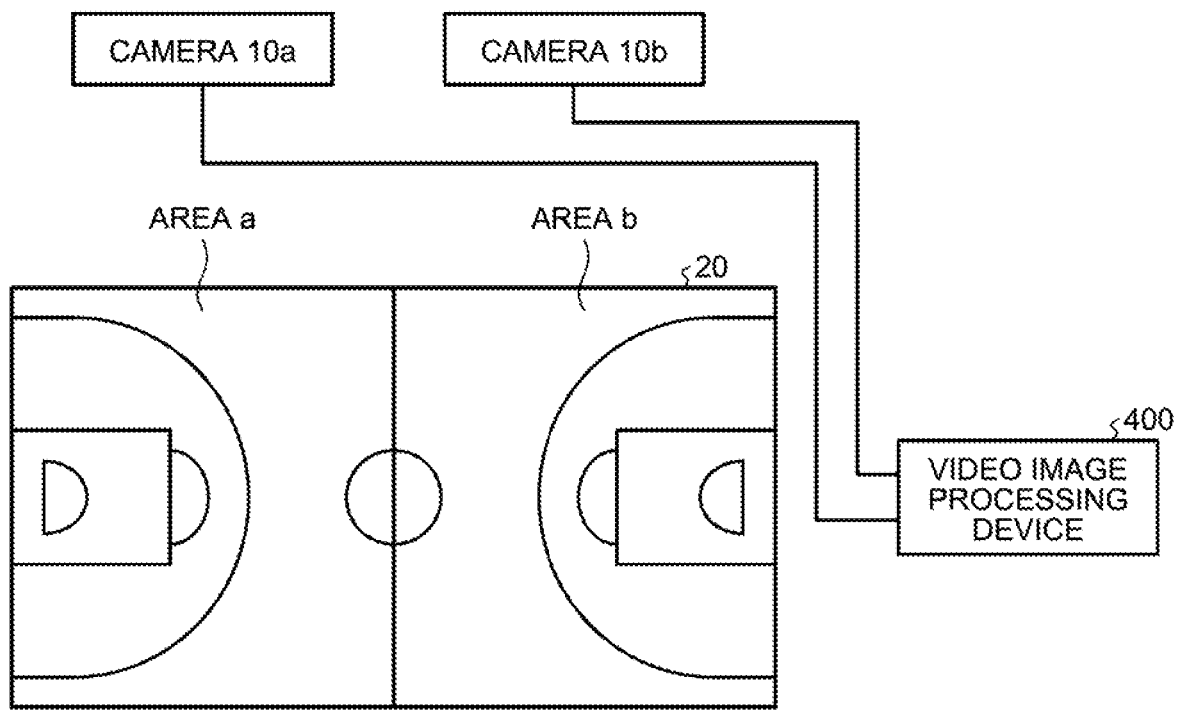
FIG. 22 is a schematic diagram illustrating the configuration of a system according to a fourth embodiment.

FIG. 22 is a schematic diagram illustrating the configuration of a system according to a fourth embodiment. As illustrated in FIG. 22, this system includes the cameras 10a and 10b and a video image processing device 400. The cameras 10a and 10b and the video image processing device 400 are connected with each other. In the fourth embodiment, in a description below, the cameras 10a and 10b are appropriately referred to as the camera 10 as a group.

The camera 10 is a device that captures the video image in the image capturing range and that sends information on the captured video image to the video image processing device 400. The information on the video image is information on continuous images at time intervals. In a description below, the information on the video image is referred to as video image information. The camera 10 is arranged in the court 20 in which various kinds of competitions are held.

The camera 10a is a camera that includes, in the image capturing range, the area a in the court 20. The camera 10b is a camera that includes, in the image capturing range, the area b in the court 20.

The video image processing device 400 is a device that focuses attention on the position of the ball used by a ball game; that extracts a video image, captured by the camera 10, of the area that includes the ball in the image capturing range; and that concatenates the extracted video images. Here, as an example, a description will be given by using a ball as a basketball; however, the ball is not limited to this and any ball may also be used as long as the ball used by a ball game, such as soccer, volleyball, water polo, handball, or the like, is used.

Figure 23:
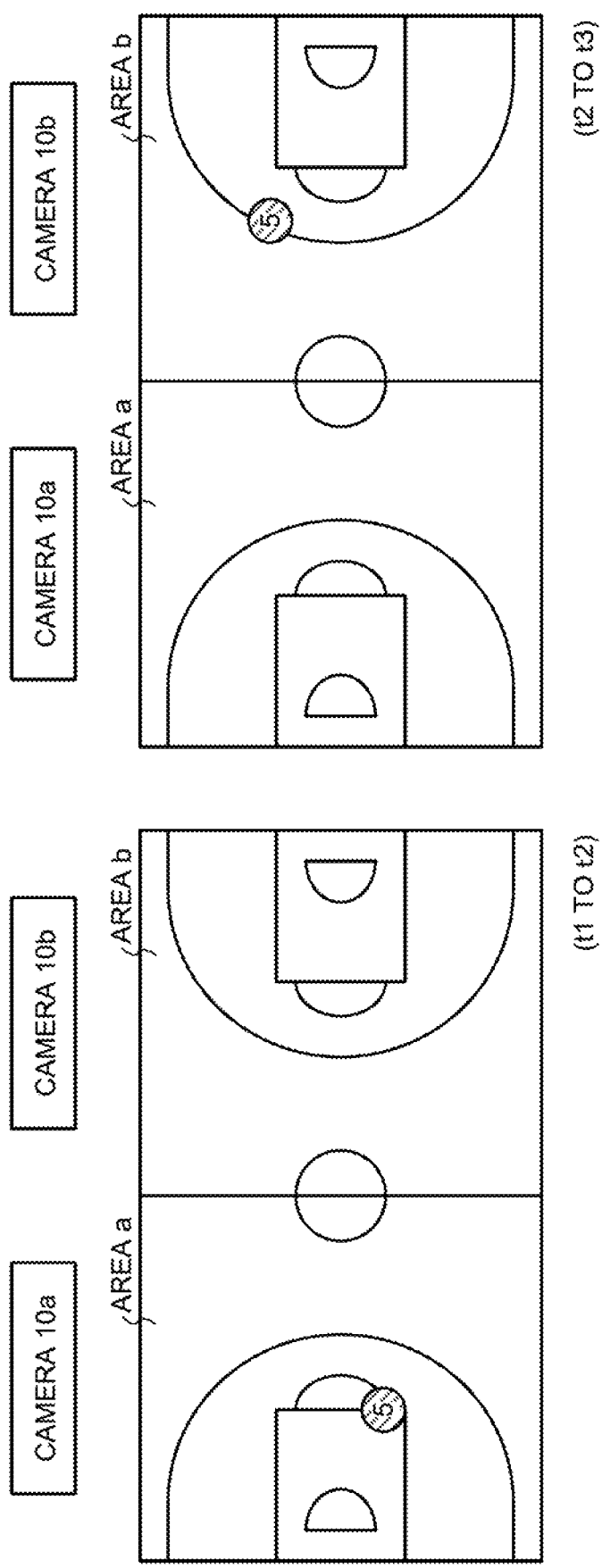
FIG. 23 is a schematic diagram illustrating a process performed by a video image processing device according to the fourth embodiment.

FIG. 23 is a schematic diagram illustrating a process performed by a video image processing device according to the fourth embodiment. For example, if a ball is present in the area a at the period of time between the time t1 and the t2, the video image processing device 400 extracts the partial video image A captured by the camera 10a in the period of time between the time t1 and the time t2.

In contrast, if the ball is present in the area b in the period of time between the time t2 and the time t3, the video image processing device 400 extracts, in the time period between the time t2 and the time t3, the partial video image B captured by the camera 10b. The video image processing device 400 concatenates the partial video image A with the partial video image B and creates the video image information.

Figure 24:
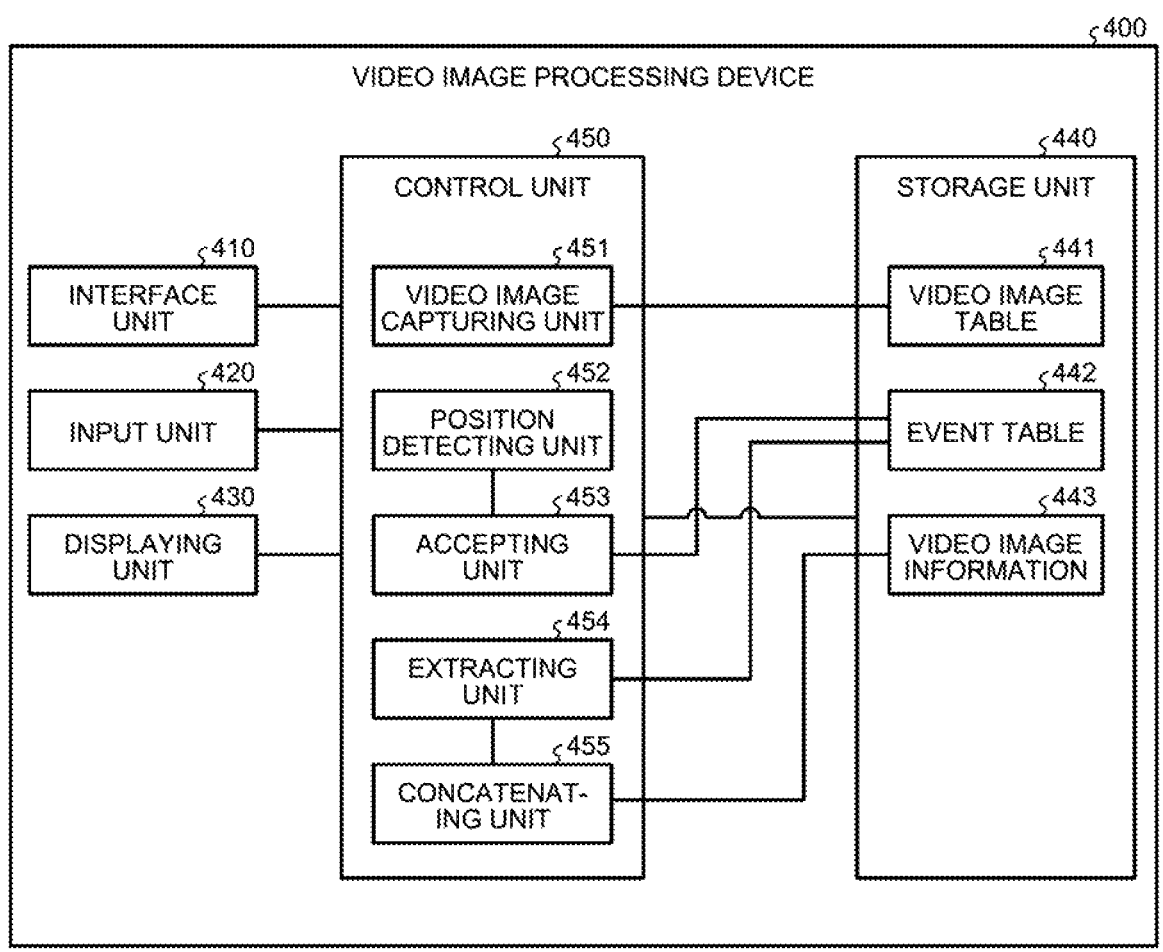
FIG. 24 is a functional block diagram illustrating the configuration of the video image processing device according to the fourth embodiment.

FIG. 24 is a functional block diagram illustrating the configuration of the video image processing device according to the fourth embodiment. As illustrated in FIG. 24, the video image processing device 400 includes an interface unit 410, an input unit 420, a displaying unit 430, a storage unit 440, and a control unit 450.

The interface unit 410 is a processing unit that is connected to the camera 10 in a wired or a wireless manner and that sends and receives data. The interface unit 410 receives the video image information from the camera 10 and outputs the received video image information to a video image capturing unit 451.

The input unit 420 is an input device that is used to input various kinds of information to the video image processing device 400. The input unit 420 corresponds to, for example, a keyboard, a mouse, a touch panel, an input button, or the like.

The displaying unit 430 is a display device that displays information that is output from the control unit 450. For example, the displaying unit 430 corresponds to a display, a touch panel, or the like.

The storage unit 440 includes a video image table 441, and an event table 442, video image information 443. The storage unit 440 corresponds to, for example, a semiconductor memory device, such as a RAM, a ROM, a flash memory, or the like, or corresponds to a storage device, such as a hard disk, an optical disk, or the like.

The video image table 441 is a table that stores therein the video image information received from the camera 10. The data structure of the video image table 441 is the same as that of the video image table 241 described with reference to FIG. 13; therefore, a description thereof will be omitted.

The event table 442 is a table that holds the event information. Here, in the fourth embodiment, as an example, the video image processing device 400 judges that an event has occurred at the timing in which a change occurs in the area in which the ball is located. Furthermore, the event information is information in which a period of time is associated with the area identification information. The data structure of the event table 442 is obtained by, similarly to the event table 242 illustrated in FIG. 14, associating a period of time with the area identification information.

In the fourth embodiment, the period of time is information indicating a period of time from the time at which the event this time has occurred to the time at which the next event occurs. The area identification information is information that uniquely identifies the area in which the ball 5 is present at the subject period of time.

The video image information 443 is video image information that is created by concatenating the partial video images that are associated with the event information.

The control unit 450 includes the video image capturing unit 451, a position detecting unit 452, an accepting unit 453, an extracting unit 454, and a concatenating unit 455. The control unit 450 corresponds to, for example, an integrated device, such as an ASIC, an FPGA, or the like. Furthermore, the control unit 450 corresponds to, for example, an electronic circuit, such as a CPU, an MPU, or the like.

The video image capturing unit 451 is a processing unit that receives the video image information from the camera 10 via the interface unit 410. The video image capturing unit 451 associates the camera identification information with the video image information and stores the associated information in the video image table 441. Furthermore, it is assumed that the camera identification information that indicates the transmission source of the video image information is attached to the video image information that is acquired from the camera 10.

The position detecting unit 452 is a processing unit that detects the area in which the ball 5 is positioned. The position detecting unit 452 outputs, to the accepting unit 453, the area identification information that uniquely identifies the area in which the ball 5 is positioned.

Here, the position detecting unit 452 may also detect the area in which the ball 5 is present by using any known technology. For example, a device that emits a signal to the ball 5 is arranged and receivers (not illustrated in the drawing) that receive such signal are arranged on the area a side and the area b side. The position detecting unit 452 performs data communication with each of the receivers and judges that the ball 5 is present in the area that is on the side of the receiver and in which the signal intensity from the ball 5 is greater. Furthermore, the position detecting unit 452 may also perform template matching with the video image information stored in the video image table, detect the ball 5, and judge that the ball 5 is present in the area that corresponds to the image capturing range of the camera that captures the video image of the detected ball 5 indicated by the video image information.

The accepting unit 453 is a processing unit that receives, from the position detecting unit 452, area identification information on the area in which the ball is present and that judges that the occurrence of the event has been accepted at the time at which the area identification information has been changed. If the accepting unit 453 receives the occurrence of the event, the accepting unit 453 creates the event information and registers the event information in the event table 442. The event information is information in which a period of time is associated with the area identification information. The period of time is information indicating a period of time from the time at which the event occurs this time to the time at which the next event occurs. The area identification information is information that uniquely identifies the area in which the ball 5 is present at the subject period of time. Furthermore, if the accepting unit 453 receives the occurrence of the first event, the accepting unit 453 waits for the process of creating the event information until the next event occurs.

The extracting unit 454 is a processing unit that judges, if an event occurs, the camera 10 that includes, in the image capturing range, the area that is in the court 20 and in which the event has occurred and that extracts, from the video image information on the video image captured by the judged camera, the partial video image of the event that has occurred at the period of time. The extracting unit 454 outputs the information on the extracted partial video image to the concatenating unit 455. The extracting unit 454 repeatedly performs the process described above every time an event occurs.

For example, the extracting unit 454 acquires unselected event information from the event table 442. The extracting unit 454 acquires, from the video image table, the video image table that is associated with the area identification information included in the event information. Furthermore, the extracting unit 454 extracts, from the acquired video image information, the partial video image that is included in the event information and that is obtained at the period of time. By repeatedly performing the process described above on each of the pieces of the event information stored in the event table 442, the extracting unit 454 extracts the information on the plurality of partial video images and outputs the extracted information to the concatenating unit 455.

The concatenating unit 455 is a processing unit that creates the video image information 443 by concatenating the partial video images extracted by the extracting unit 454.

The concatenating unit 455 may also concatenate each of the partial video images by using any method. For example, the concatenating unit 455 may also concatenate each of the partial video images in time series. The concatenating unit 455 stores the video image information 443 in the storage unit 440.

Figure 25:
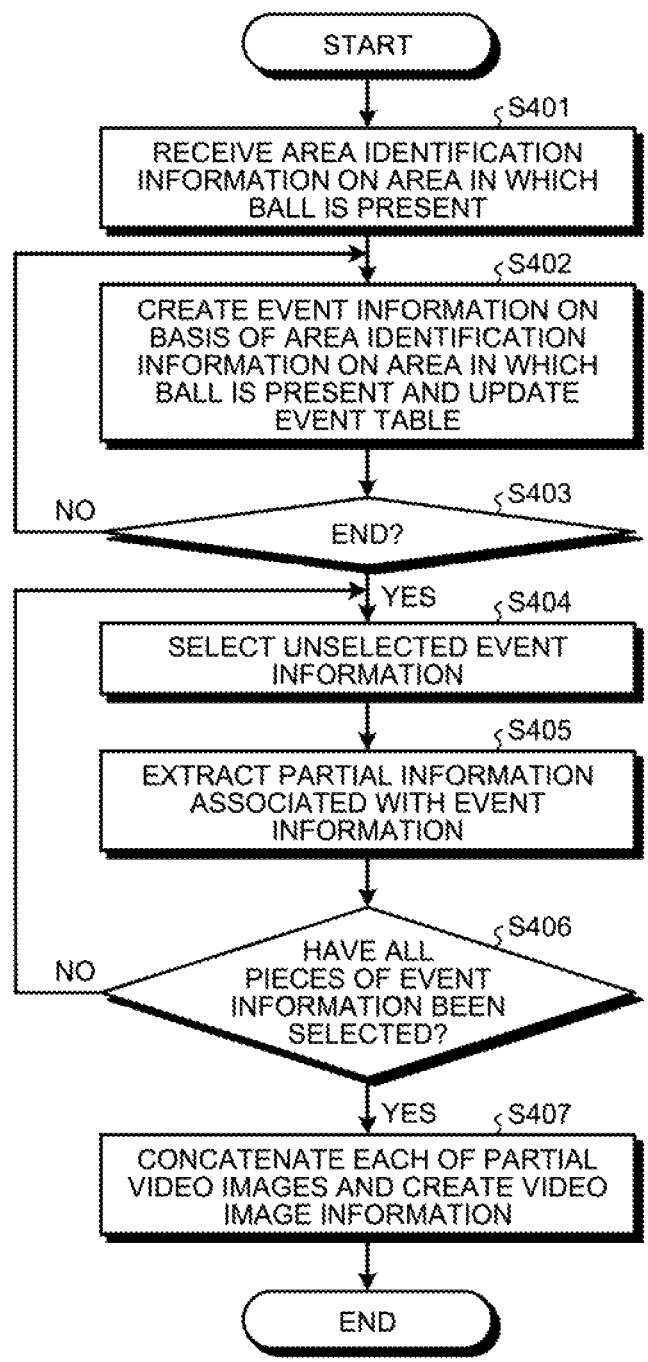
FIG. 25 is a flowchart illustrating the flow of a process performed by the video image processing device according to the fourth embodiment.

In the following, the flow of the process performed by the video image processing device 400 according to the fourth embodiment will be described. FIG. 25 is a flowchart illustrating the flow of a process performed by the video image processing device according to the fourth embodiment. As illustrated in FIG. 25, the accepting unit 453 in the video image processing device 400 receives s the area identification information on the area in which the ball 5 is present (Step S401). The accepting unit 453 creates the event information on the basis of the area identification information on the area in which the ball is present and updates the event table 442 (Step S402).

The accepting unit 453 judges whether the accepting unit 453 ends the update of the event table 442 (Step S403). If the accepting unit 453 does not end the update of the event table 442 (No at Step S403), the accepting unit 453 proceeds to Step S402. If the accepting unit 453 ends the update of the event table 442 (Yes at Step S403), the accepting unit 453 proceeds to Step S404.

The extracting unit 454 in the video image processing device 400 selects unselected event information from the event table 442 (Step S404). The extracting unit 454 extracts the partial information associated with the event information from the video image table 441 (Step S405). If the extracting unit 454 has not selected all of the pieces of the event information (No at Step S406), the extracting unit 454 proceeds to Step S404.

In contrast, if the extracting unit 454 has selected all of the pieces of the event information (Yes at Step S406), the extracting unit 454 proceeds to Step S407. The concatenating unit 455 in the video image processing device 400 concatenates each of the partial video images and creates the video image information 443 (Step S407).

In the following, the effect of the video image processing device 400 according to the fourth embodiment will be described. The video image processing device 400 judges that an event has occurred at the time of the occurrence of a change in the area in which the ball is present; extracts the partial video image of the area, between the areas a and b, in which the ball is present; and creates the video image information 443. Consequently, it is possible to efficiently create the video image information on the video image of the ball that is always captured.

Furthermore, in the fourth embodiment described above, a description has been given of a case in which the video image processing device 400 judges the area identification information on the area in which the ball 5 is present and creates the video image information; however, the embodiment is not limited to this. For example, the video image processing device 400 may also judge the area identification information on the area in which a specific player is present and create the video image information. The area in which the specific player is present may also be judged by the same method as that used when the ball 5 is detected. By performing the process, it is possible to efficiently create the video image information on the video image in which a focused player is always captured.

Figure 26:
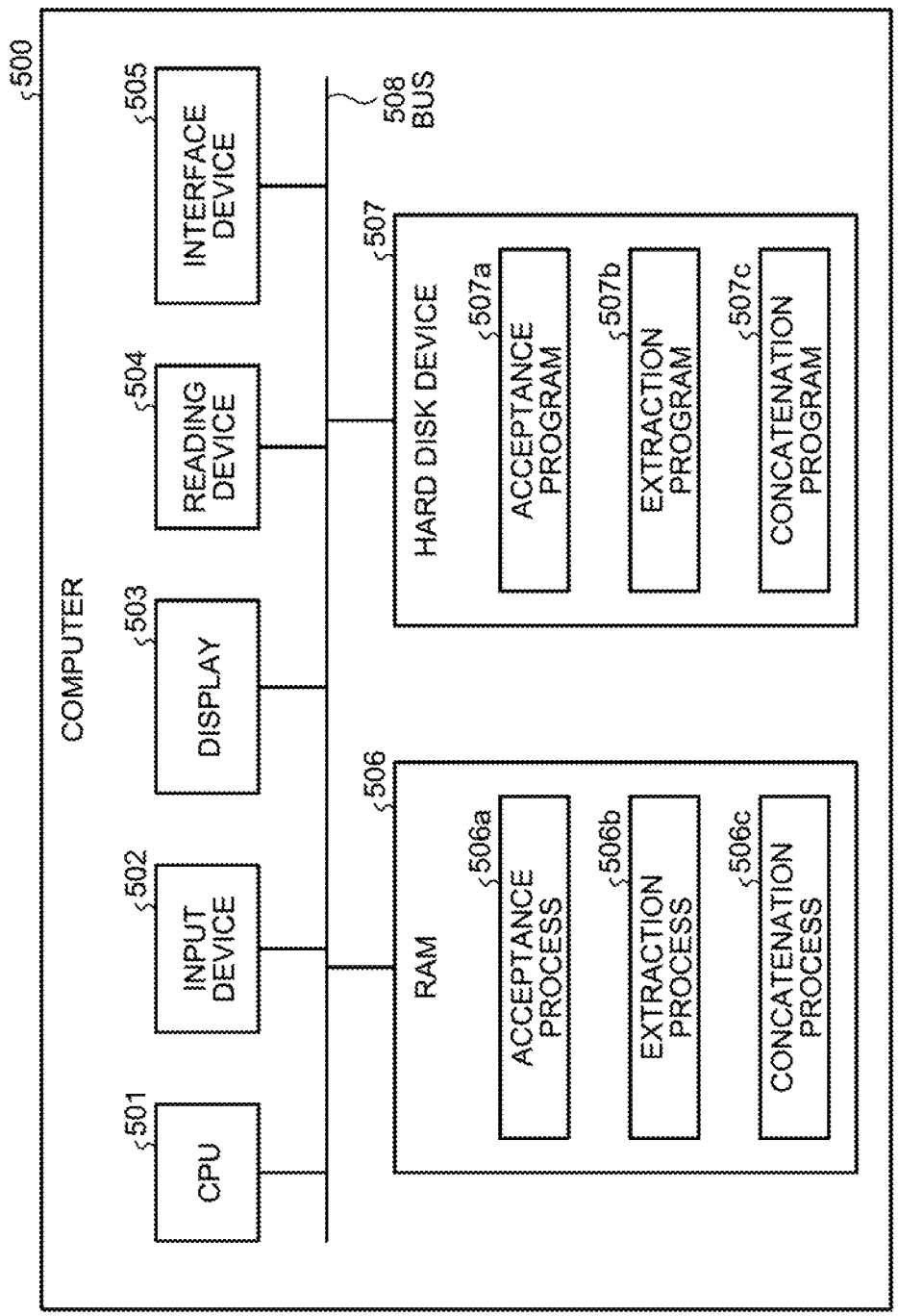
FIG. 26 is a block diagram illustrating the configuration of hardware that executes a video image processing program.

In the following, a description will be given of an example of the configuration of hardware that executes the video image processing program and that implements the same function as that performed by the video image processing devices 100 to 400 described in the above embodiments. FIG. 26 is a block diagram illustrating the configuration of hardware that executes a video image processing program.

As illustrated in FIG. 26, a computer 500 includes a CPU 501 that executes various kinds arithmetic processing, an input device 502 that accepts an input of data from a user, and a display 503. Furthermore, the computer 500 includes a reading device 504 that reads a program or the like from a storage medium and an interface device 505 that sends and receives data to and from another computer via a network. Furthermore, the computer 500 includes a RAM 506 that temporarily stores therein various kinds of information and a hard disk device 507. Then, each of the devices 501 to 507 are connected to a bus 508.

The hard disk device 507 includes an acceptance program 507a, an extraction program 507b, and a concatenation program 507c. The CPU 501 reads the acceptance program 507a, the extraction program 507b, and the concatenation program 507c and loads the read programs in the RAM 506.

The acceptance program 507a functions as an acceptance process 506a. The extraction program 507b functions as an extraction process 506b. The concatenation program 507c functions as a concatenation process 506c.

For example, the process performed by the acceptance process 506a corresponds to the processes performed by the accepting units 153, 252, 353, and 453. The process performed by the extraction process 506b corresponds to the processes performed by the extracting units 154, 253, 354, and 454. The process performed by the concatenation process 506c corresponds to the processes performed by the concatenating units 155, 254, 355, and 455.

Furthermore, the acceptance program 507a, the extraction program 507b, and the concatenation program 507c do not need to be stored in the hard disk device 507 from the beginning. For example, each of the programs is stored in a "portable physical medium", such as a flexible disk (FD), a CD-ROM, a DVD disk, a magneto-optic disk, an IC CARD, or the like that is to be inserted into the computer 500. Then, the computer 500 may also read and execute each of the programs 507a to 507c.

According to an aspect of an embodiment, it is possible to create video image information related to a specific event.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A video image processing device receiving video image information from a plurality of cameras, comprising:
a memory; and
a processor coupled to the memory and the processor configured to
acquire the video image information of a plurality of regions included in a competition area, the video image information being captured from the plurality of regions by the plurality of cameras, respectively,
store the acquired video image information in association with camera identification information of each of the plurality of cameras and region identification information of each of the regions, into the memory, receive event information indicating whether an event has occurred at a time in one of the regions in the competition area, determine, from among the plurality of cameras, a capturing camera that captured event video image information of the one of the regions upon receipt of the event information, by referring to the memory in which the camera identification information of the capturing camera is associated with the region identification information of the one of the regions, extract, from the video image information stored in the memory, a partial video image captured by the camera, based on the camera identification information of the camera, concatenate a plurality of partial video images extracted for a plurality of events, respectively, to obtain concatenated partial video images including the partial video image, and output the concatenated partial video images to the memory.

2. The video image processing device according to claim 1, wherein, when the processor receives the event information including player identification information that identifies a player, action identification information that identifies an action of the player, and the time at which the player takes the action, the processor determines that the event has occurred in the one of the regions in which the player indicated by the player identification information is present at the time.

3. The video image processing device according to claim 1, wherein the processor determines that, when a region in which a number of players is the largest among the regions is changed to another region, the event has occurred in the other region.

4. The video image processing device according to claim 1, wherein, when a shoot scene has occurred, the processor determines that the event has occurred.

5. The video image processing device according to claim 1, wherein, the processor determines that, when a ball is moved from a region among the regions to another region, the event has occurred in the other region.

6. The video image processing device according to claim 1, wherein, the processor determines that, when a designated player has moved from a region among the regions to another region, the event has occurred in the other region.

7. A video image processing method comprising:

acquiring video image information of a plurality of regions included in a competition area, the video image information being captured from the plurality of regions by a plurality of cameras, respectively;

storing the acquired video image information in association with camera identification information of each of the plurality of cameras and region identification information of each of the regions, into a memory;

receiving event information indicating whether an event has occurred at a time in one of the regions in the competition area;

determining, from among the plurality of cameras, a capturing camera that captured event video image information of the one of the regions upon receipt of the event information, by referring to the memory in which the camera identification information of the capturing camera is associated with the region identification information of the one of the regions;

extracting, from the video image information stored in the memory, a partial video image captured by the camera, based on the camera identification information of the camera;

concatenating a plurality of partial video images, extracted for a plurality of events, respectively, to obtain concatenated partial video images including the partial video image; and outputting the concatenated partial video images to the memory.

8. The video image processing method according to claim 7, wherein, when the receiving receives the event information including player identification information that identifies a player, action identification information that identifies an action of the player, and the time at which the player takes the action, the determining determines that the event has occurred in the one of the regions in which the player indicated by the player identification information is present at the time.

9. The video image processing method according to claim 7, wherein the determining determines that, when a region in which a number of players is the largest among the regions is changed to another region, the event has occurred in the other region.

10. The video image processing method according to claim 7, wherein, when a shoot scene has occurred, the determining determines that the event has occurred.

11. The video image processing method according to claim 7, wherein the determining determines that, when a ball is moved from a region among the regions to another region, the event has occurred in the other region.

12. The video image processing method according to claim 7, wherein the determining determines that, when a designated player has moved from a region among the regions to another region, the event has occurred in the other region.

13. A non-transitory computer-readable recording medium having stored therein a video image processing program that causes a computer to execute a process comprising:

acquiring video image information of a plurality of regions included in a competition area, the video image information being captured from the plurality of regions by a plurality of cameras, respectively;

storing the acquired video image information in association with camera identification information of each of the plurality of cameras and region identification information of each of the regions, into a memory;

receiving event information indicating whether an event has occurred at a time in one of the regions in the competition area;

determining, from among the plurality of cameras, a capturing camera that captured event video image information of the one of the regions upon receipt of the event information, by referring to the memory in which the camera identification information of the capturing camera is associated with the region identification information of the one of the regions;

extracting, from the video image information stored in the memory, a partial video image captured by the camera based on the camera identification information of the camera;

concatenating a plurality of partial video images, extracted for a plurality of events, respectively, to obtain concatenated partial video images including the partial video image; and outputting the concatenated partial video images to the memory.

14. The non-transitory computer-readable recording medium according to claim 13, wherein, when the receiving receives the event information including player identification information that identifies a player, action identification information that identifies an action of the player, and the time at which the player takes the action, the determining determines that the event has occurred in the one of the regions in which the player indicated by the player identification information is present at this time.

15. The non-transitory computer-readable recording medium according to claim 13, wherein the determining determines that, when a region in which a number of players is the largest among the regions is changed to another region, the event has occurred in the other region.

16. The non-transitory computer-readable recording medium according to claim 13, wherein the determining determines that, when a ball is moved from a region among the regions to another region, the event has occurred in the other region.

17. The non-transitory computer-readable recording medium according to claim 13, wherein the determining determines that, when a designated player has moved from a region among the regions to another region, the event has occurred in the other region.

* * * * *